United States Patent
Li et al.

(10) Patent No.: US 11,591,441 B2
(45) Date of Patent: Feb. 28, 2023

(54) MODIFIED POLYSILOXANE AND APPLICATION THEREOF

(71) Applicant: NANJING UNIVERSITY, Jiangsu (CN)

(72) Inventors: Chenghui Li, Jiangsu (CN); Jiancheng Lai, Jiangsu (CN); Jinglin Zuo, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 0 days.

(21) Appl. No.: 16/978,064

(22) PCT Filed: Mar. 22, 2018

(86) PCT No.: PCT/CN2018/079998
§ 371 (c)(1),
(2) Date: Sep. 3, 2020

(87) PCT Pub. No.: WO2019/169670
PCT Pub. Date: Sep. 12, 2019

(65) Prior Publication Data
US 2021/0040268 A1  Feb. 11, 2021

(30) Foreign Application Priority Data
Mar. 4, 2018 (CN) .......................... 201810176863.2

(51) Int. Cl.
| | | |
|---|---|---|
| C08G 77/388 | (2006.01) | |
| C08J 3/24 | (2006.01) | |
| C08G 77/385 | (2006.01) | |
| C08G 77/392 | (2006.01) | |
| C08G 77/395 | (2006.01) | |
| C08G 77/398 | (2006.01) | |

(52) U.S. Cl.
CPC ......... C08G 77/388 (2013.01); C08G 77/385 (2013.01); C08G 77/392 (2013.01); C08G 77/395 (2013.01); C08G 77/398 (2013.01); C08J 3/24 (2013.01); C08J 3/246 (2013.01)

(58) Field of Classification Search
CPC ...... C08G 77/26; C08G 77/30; C08G 77/395; C08L 83/08
See application file for complete search history.

(56) References Cited

U.S. PATENT DOCUMENTS

| | | | | |
|---|---|---|---|---|
| 5,290,901 A | * | 3/1994 | Burns ..................... | C08G 77/16 528/34 |
| 5,891,969 A | * | 4/1999 | Mine ..................... | H01L 23/296 525/476 |
| 7,834,083 B2 | * | 11/2010 | Shin ......................... | C08K 3/22 524/588 |
| 8,329,156 B2 | * | 12/2012 | Horstman .............. | C08G 77/14 424/78.37 |
| 2009/0137764 A1 | * | 5/2009 | Sutton .................... | C08G 77/38 528/25 |
| 2012/0282210 A1 | * | 11/2012 | Henning .............. | C08G 77/388 106/287.11 |
| 2019/0077100 A1 | * | 3/2019 | Li ........................... | B29C 73/16 |
| 2019/0315934 A1 | * | 10/2019 | Zelisko ................. | B29C 73/163 |

FOREIGN PATENT DOCUMENTS

| | | |
|---|---|---|
| CN | 101679753 A | 3/2010 |
| CN | 101265329 B | 6/2011 |
| CN | 102633953 A | 8/2012 |
| CN | 105348550 A | 2/2016 |
| CN | 105694044 A | 6/2016 |
| CN | 106009702 A * | 10/2016 |

(Continued)

OTHER PUBLICATIONS

"Soft-to-hard Transformation of the Mechanical Properties of Dynamic Covalent Polymers Through Component Incorporation" authored by Ono et al. and published in Chemical Communications (2007) 46-48.*

(Continued)

*Primary Examiner* — Marc S Zimmer

(74) *Attorney, Agent, or Firm* — Novick, Kim & Lee, PLLC; Allen Xue

(57) ABSTRACT

A modified polysiloxane has formula (I)

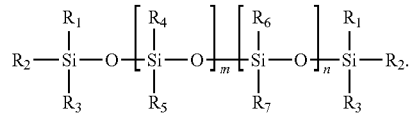

In formula (I) m is an integer between 0 and 10000; n is an integer between 0 and 10000; m and n cannot be equal to 0 simultaneously; $R_1$-$R_7$ are the same or different; and at least one of $R_1$-$R_7$ includes a group having a reversible chemical bond system based on a hydrogen bond, a coordinate bond, or a covalent bond. The polysioxane is used as a main chain to introduce a reversible chemical bond having temperature sensitivity by using a chemical method, so as to obtain a polymer material which is highly sensitive to temperature. The temperature-sensitive properties of materials provide functional materials for specific applications, such as medical external fixation materials, orthopedic materials, and packaging materials, can be obtained by using particular processing and preparation methods.

11 Claims, 1 Drawing Sheet

(56) References Cited

FOREIGN PATENT DOCUMENTS

| CN | 106243349 A | | 12/2016 |
|---|---|---|---|
| CN | 107141388 A | | 9/2017 |
| JP | 11-209658 | * | 8/1999 |
| JP | 2005292104 A | | 10/2005 |
| JP | 4422540 B2 | | 2/2010 |
| JP | 2017-114830 | * | 6/2017 |

OTHER PUBLICATIONS

Machine translation of JP 11-209658 into English (no date).*
Abstract for CN 105111470 A (Dec. 2015).*
"Strechable Self-healing Polymeric Dielectrics Cross-linked Through Metal-Ligand Coordination" authored by Rao et al. and published in JACS (2016) 138, 6020-6027.*
Machine translation of CN 106009702 (no date).*
Wang, Yang; Synthesis, Structures and Properties of Organosilicon Supramolecular Polymers Constructed by Hydrogen Bonds; Non-official translation: Master's Theses of Shandong University; May 10, 2011.

* cited by examiner

MODIFIED POLYSILOXANE AND APPLICATION THEREOF

BACKGROUND

Technical Field

The present invention belongs to the field of polymer materials, and more particularly relates to a modified polysiloxane and application thereof.

RELATED ART

Temperature-sensitive materials, which exhibit reversible response to the external environment temperature (energy), are very important intelligent materials, and have wide application prospects because their properties obviously change under the influence of temperature. At present, temperature-sensitive polymer materials are mainly based on a principle that the mobility of polymer chains change along with the change of temperature. At a low temperature, the entanglement between polymer chain segments is serious, and the movement is hindered, so that the temperature-sensitive polymer materials are stronger and tougher. At a high temperature, the entanglement between the polymer chain segments is gradually loosened, and the movement is freer, so that the temperature-sensitive polymer materials are more flexible and softer. However, the entanglement effect between the polymer chain segments is less dependent on the temperature, so that a wider temperature range is needed to enable the material to show more obvious strength change, or, the strength change of the material cannot meet the practical requirement within the temperature range in use, which brings much inconvenience to the practical application.

The temperature-sensitive polymer materials disclosed or reported at present still need to be improved in aspects of temperature-sensitive properties and preparation methods. The patent CN106243349A disclosed a biocompatible temperature-sensitive polymer material based on lactic acid and alanine. In the invention, dehydrated lactic acid is firstly prepared from lactic acid, and then is subjected to polymerization reaction with alanine to obtain a temperature-sensitive polymer material. The addition of a natural product endows the temperature-sensitive polymer material with certain biocompatibility, but causes adverse influence on the temperature-sensitive properties at the same time. In addition, a stannous chloride catalyst used in the invention belongs to a highly toxic substance, having serious influence on both the human body and the environment. The patent CN201710384625.6 disclosed a poly(methyl methacrylate)/zinc oxide type temperature-sensitive material and a preparation method thereof. The invention synthesizes poly(methyl methacrylate) and zinc oxide at the same time by using a one-step method to directly prepare a temperature-sensitive organic-inorganic hybrid temperature-sensitive material. The synthesis process of the material is simple, but the uniformity performance of the obtained material is greatly influenced by the synthetic conditions; the temperature sensitivity depends on the interaction between chain segments of the polymer material, and the temperature-sensitive properties need to be improved. The patent CN105348550A disclosed a preparation method of a PDMS film with temperature sensitivity. The invention obtains an optically transparent and temperature-sensitive PDMS film by adding cadmium telluride quantum dots into PDMS prepolymers. The fluorescence performance of the quantum dots is controlled through the temperature change, and the PDMS is mainly used as a basis material. However, the preparation method is complicated. The temperature-sensitive cadmium telluride quantum dots need to be prepared firstly, then are purified and dispersed into the PDMS prepolymers and a curing agent, the mixture is coated on a glass slide and cured in an oven to obtain the temperature-sensitive PDMS film. In addition, the dispersion uniformity of the cadmium telluride quantum dots in the PDMS prepolymer directly influences the temperature-sensitive properties of the film. At present, the development of new temperature-sensitive materials is still a research hotspot among scientists.

SUMMARY

In order to improve temperature-sensitive properties of existing temperature-sensitive polymer materials and in view of the defects in the prior art, the present invention introduces reversible chemical bonds into a polysiloxane polymer material by using a chemical modification method to obtain a polymer material with good temperature-sensitive properties. Due to the presence of reversible chemical bonds in the polymer chain, the polymer material can obviously change in mechanical properties within a particular temperature range, and therefore has special application prospects in aspects of medical external fixation materials, orthopedic materials, packaging materials and the like.

The present invention has the following specific technical solutions:

The present invention discloses a modified polysiloxane, which has the following structural formula:

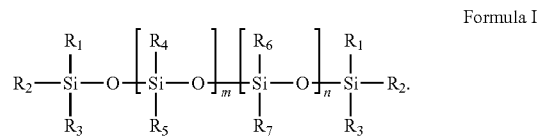

Formula I

In Formula I, m and n represent repeating numbers of corresponding repeating units.

m is an integer between 0 and 10000, and has preferably a value in the range of 0 to 200.

n is an integer between 0 and 10000, and has preferably a value in the range of 0 to 200.

m and n cannot be equal to 0 simultaneously.

$R_1$-$R_7$ are the same or different. At least one of $R_1$-$R_7$ has a structure of Formula II, and the others are selected from an amino group, a hydroxyl group, a thiol group, a carboxyl group, a methoxyl group, a nitro group, a halogen atom, a C1-C50 (preferably C1-C30, more preferably C1-C18) alkyl group or cycloalkyl group non-substituted or substituted by one or more amino groups, hydroxyl groups, thiol groups, carboxyl groups, methoxyl groups, nitro groups or halogen atoms, and a phenyl group or naphthyl group non-substituted or substituted by one or more C1-C50 (preferably C1-C30, more preferably C1-C18) alkyl groups, C1-C50 (preferably C1-C30, more preferably C1-C18) alkoxy groups, hydroxyl groups, amino groups, thiol groups or halogen atoms.

Preferably, $R_1$-$R_7$ are the same or different. At least one of $R_1$-$R_7$ has a structure of Formula I, and the others are selected from an amino group, a hydroxyl group, a thiol group, a carboxyl group, a methoxyl group, a nitro group, a phenyl group, a benzyl group, a phenolic group, an alkoxyphenyl group (such as

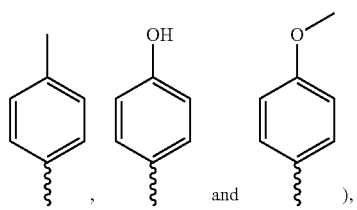

a C1-C30 alkyl group, a C1-C30 alkoxy group, and a C1-C30 halogenated alkyl group.

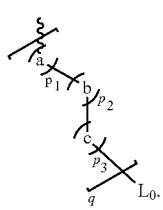

Formula II

In Formula II, a, b and c are the same or different, and represent units formed by connecting one or more of —$CH_2$—, —NH—, —O—, —S—, —COO—, —CO— and —$CH(R_8)$— in any order. $R_8$ represents a hydrogen atom or an amino group, a hydroxyl group, a thiol group, a carboxyl group, a methoxyl group, a nitro group, a halogen atom, a C1-C50 (preferably C1-C30, more preferably C1-C18) alkyl group or cycloalkyl group non-substituted or substituted by one or more amino groups, hydroxyl groups, thiol groups, carboxyl groups, methoxyl groups, nitro groups or halogen atoms, and a phenyl group or naphthyl group non-substituted or substituted by one or more C1-C50 (preferably C1-C30, more preferably C1-C18) alkyl groups, C1-C50 (preferably C1-C30, more preferably C1-C18) alkoxy groups, hydroxyl groups, amino groups, thiol groups or halogen atoms. $p_1$, $p_2$ and $p_3$ are the same or different, and are integers between 0 and 500. q is an integer between 0 and 500.

Optionally, in a structure of Formula II, a, b and c are the same or different, and represent units formed by connecting one or more of —$CH_2$—, —NH—, —O—, —CO— and —$CH(R_8)$— in any order. $R_8$ represents a methyl group, an ethyl group, a phenyl group, a hydroxyl group, a thiol group, a carboxyl group and an amino group. $p_1$, $p_2$ and $p_3$ are integers between 0 and 20. q is an integer between 0 and 20.

Preferably, -[(a)$p_1$-(b)$p_2$-(c)$p_3$]q- is selected from the following combination:

$p_2$ and $p_3$ are equal to 0; -[(a)$p_1$-(b)$p_2$-(c)$p_3$]q- represents —($CH_2$)$p_1$-, —(NH)$p_1$-, —(S)$p_1$-, —(CO)$p_1$- and —(CH($R_8$))$p_1$-; $p_1$ is an integer between 0 and 20; and q is 1.

Or, $p_3$ is equal to 0; -[(a)$p_1$-(b)$p_2$-(c)$p_3$]q- represents —[($CH_2$)$p_1$-(NH)$p_2$]q-, —[($CH_2$)$p_1$-(O)$p_2$]q-, —[($CH_2$)$p_1$-(S)$p_2$]q-, —[($CH_2$)$p_1$-(COO)$p_2$]q-, —[($CH_2$)$p_1$-(CO)$p_2$]q-, —[(CH($R_8$))$p_1$-($CH_2$)$p_2$]q-, —[(NH)$p_1$-($CH_2$)$p_2$]q-, —[(S)$p_1$-(CO)$p_2$]q- and —[(CH($R_8$))$p_1$-(COO)$p_2$]q-; $p_1$ and $p_2$ are integers between 1 and 20; and q is an integer between 1 and 20.

Or, —[($CH_2$)$p_1$-(O)$p_2$-($CH_2$)$p_3$]q-, —[($CH_2$)$p_1$-($CH_2$)$p_2$-(O)$p_3$]q-, —[(CO)$p_1$-($CH_2$)$p_2$-(CO)$p_3$]q, —[(CO)$p_1$-(O)$p_2$-(CO)$p_3$-]q, —[(CH($R_8$))$p_1$-($CH_2$)$p_2$-(CH($R_8$))$p_3$]q- and —[(CH($R_8$))$p_1$-($CH_2$)$p_2$-($CH_2$)$p_3$]q-; $p_1$, $p_2$ and $p_3$ are integers between 1 and 20; and q is an integer between 1 and 20.

The above $R_8$ represents a methyl group, an ethyl group, a phenyl group, a hydroxyl group, a carboxyl group or an amino group.

According to the types of the reversible chemical bonds, an $L_0$ group can be divided into: a reversible chemical bond system based on a hydrogen bond, a reversible chemical bond system based on a coordination bond, and a reversible chemical bond system based on a covalent bond.

For a group having a hydrogen bond system reversible chemical bond, $L_0$ can be:

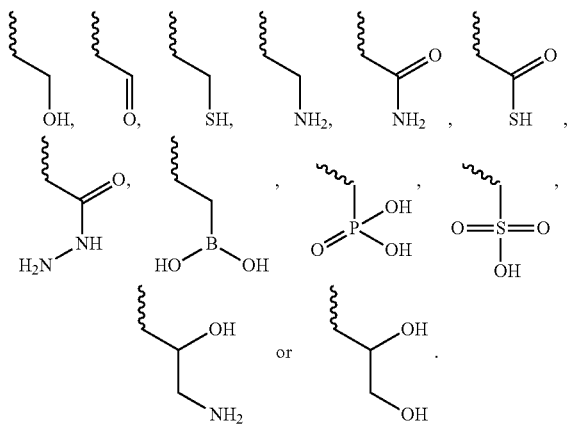

Preferably, $L_0$ represents

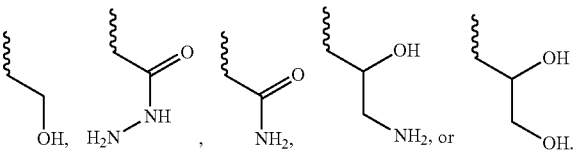

For a group having a coordination bond system reversible chemical bond, $L_0$ can be formed by a ligand and a metal M through coordination. The ligand is:

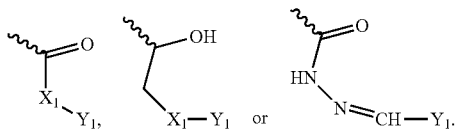

M is one or more of alkali metal, alkaline earth metal and transition metal ions, and is preferably $Zn^{2+}$, $Cu^{2+}$, $Fe^{3+}$, $Fe^{2+}$, $Co^{2+}$, $Pb^{2+}$, $Sn^{2+}$, $Al^{3+}$, $Ag^+$, $Ni^{2+}$, $Ca^{2+}$, $Eu^3$, $Tb^{3+}$, $Na^+$ and $K^+$.

$X_1$ represents —$CH_2$—, —NH—, —O—, —S—, —COO— or —CO—.

$Y_1$ represents:

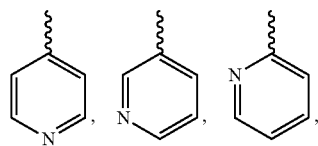

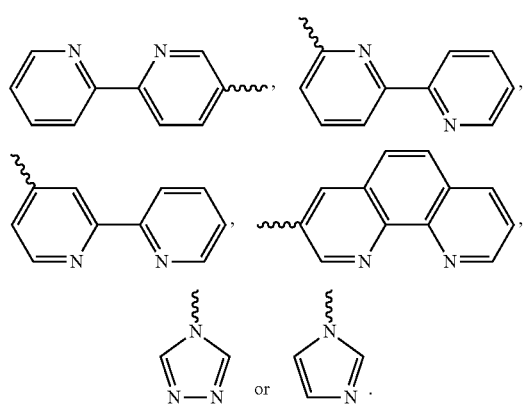
Preferably, $L_0$ represents
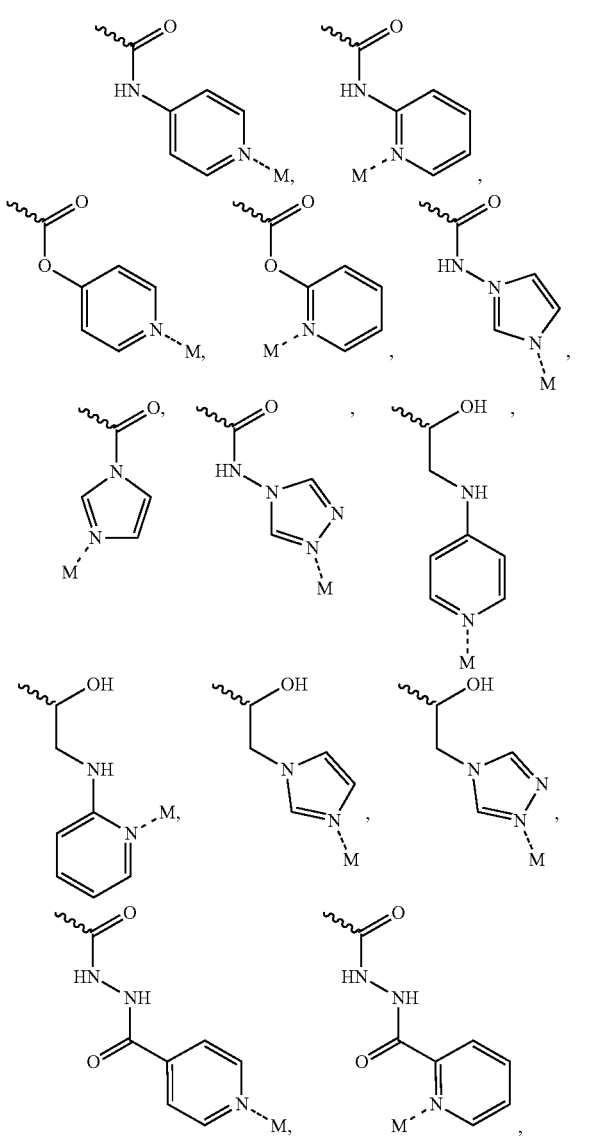
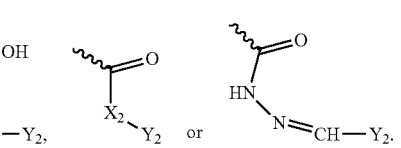
In the structural formula, a dotted line represents a coordination bond between a coordinating group and a coordinate metal.
For groups with reversible chemical bonds in a covalent bond system, $L_0$ can be:
$X_2$ represents —$CH_2$—, —NH—, —O—, —S—, —COO— or —CO—.

$Y_2$ represents:
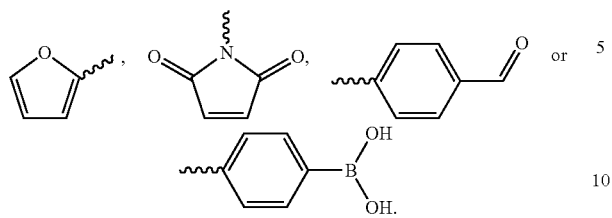
Preferably, $L_0$ represents
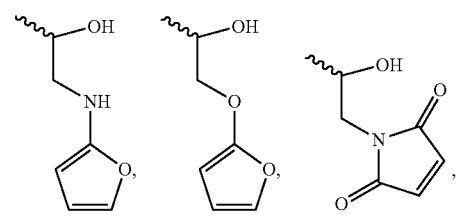
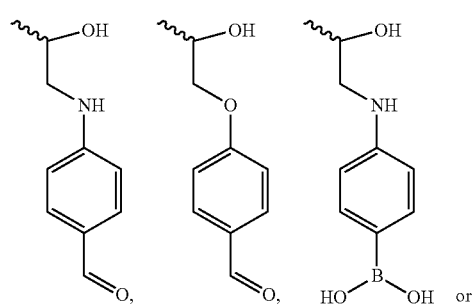
According to the present invention, the structure of Formula II is preferably:
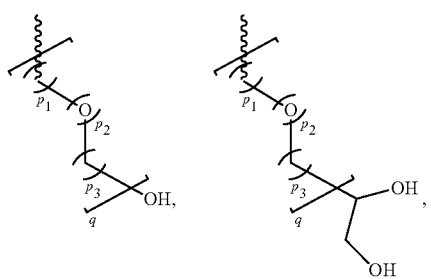
-continued
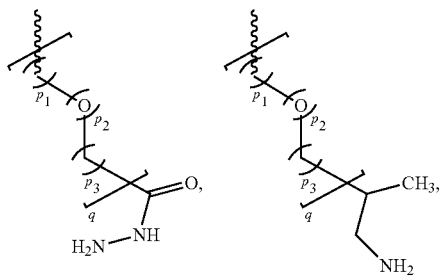

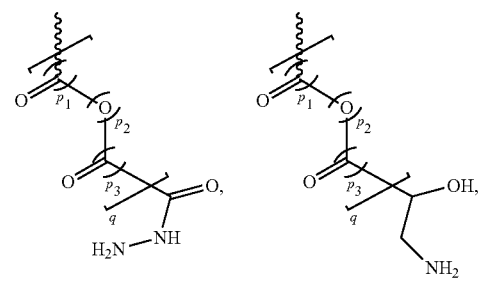
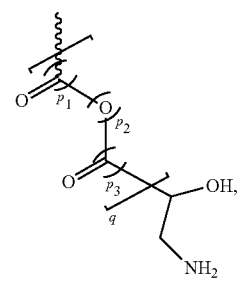
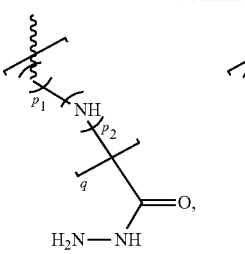
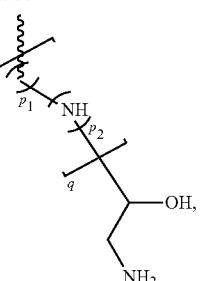
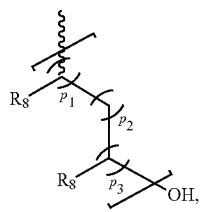
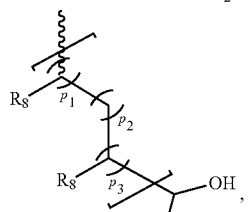
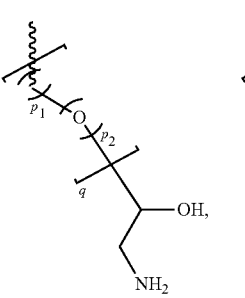
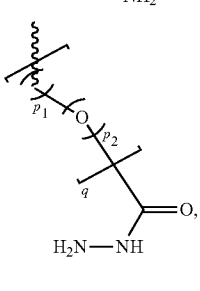
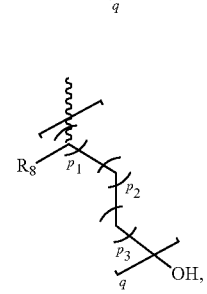
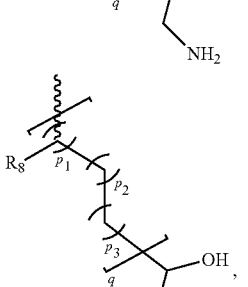
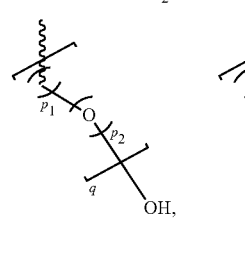
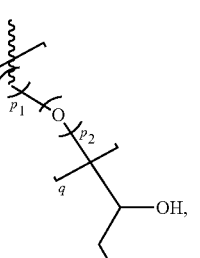
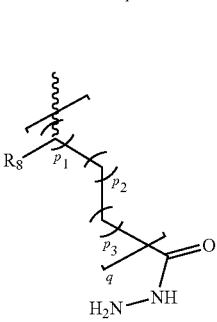
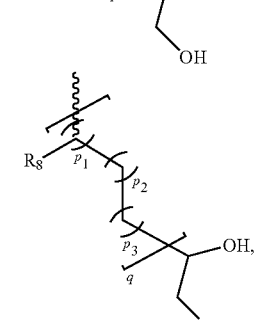
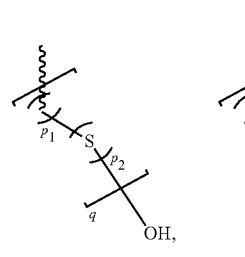
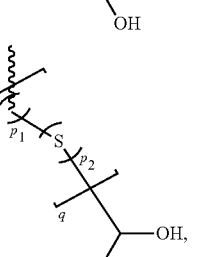
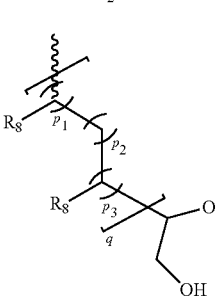
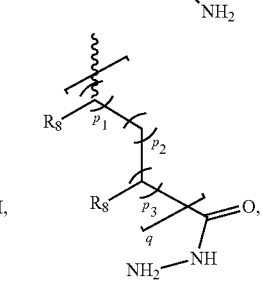
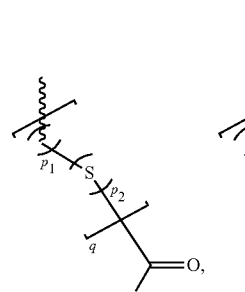
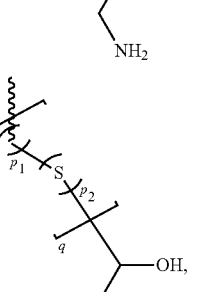
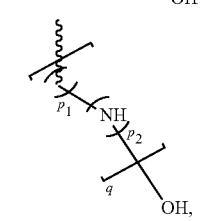
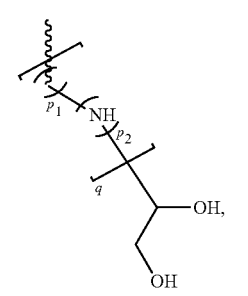
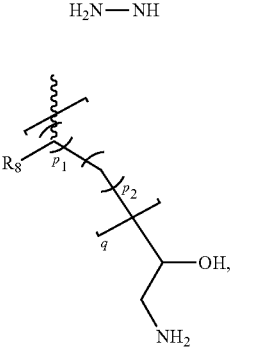
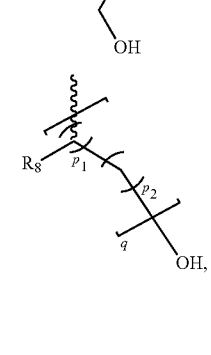

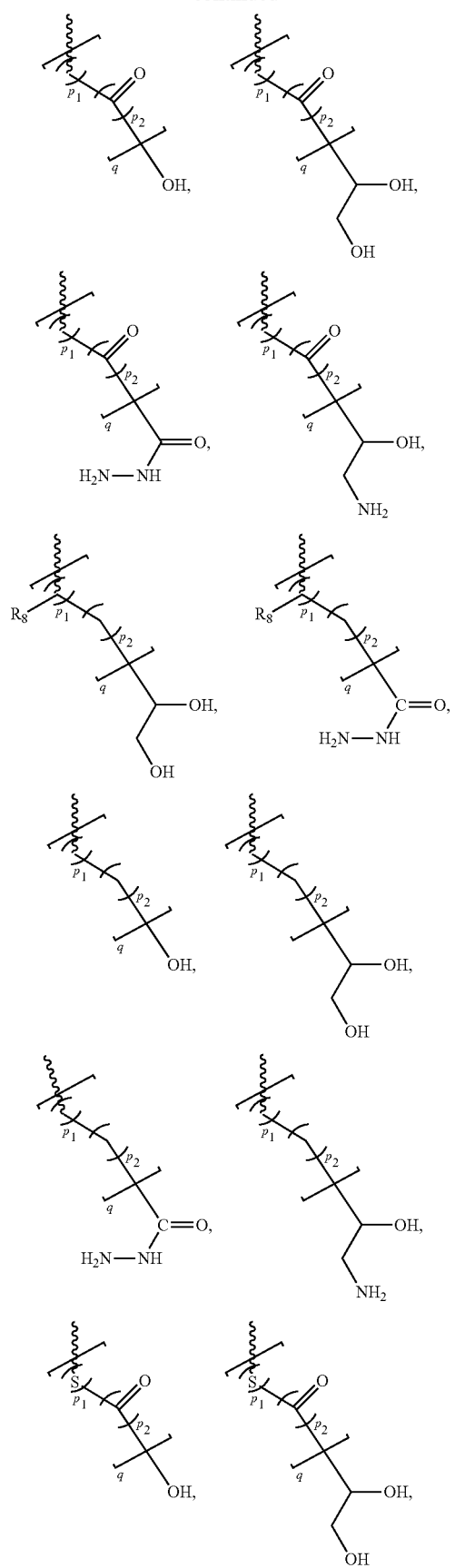
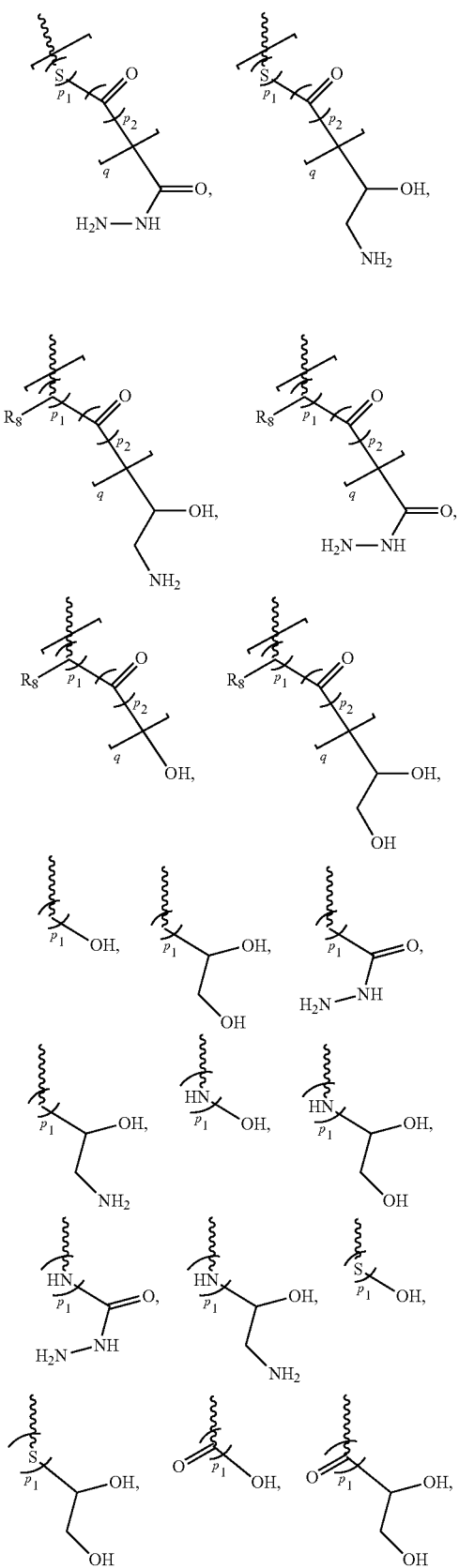

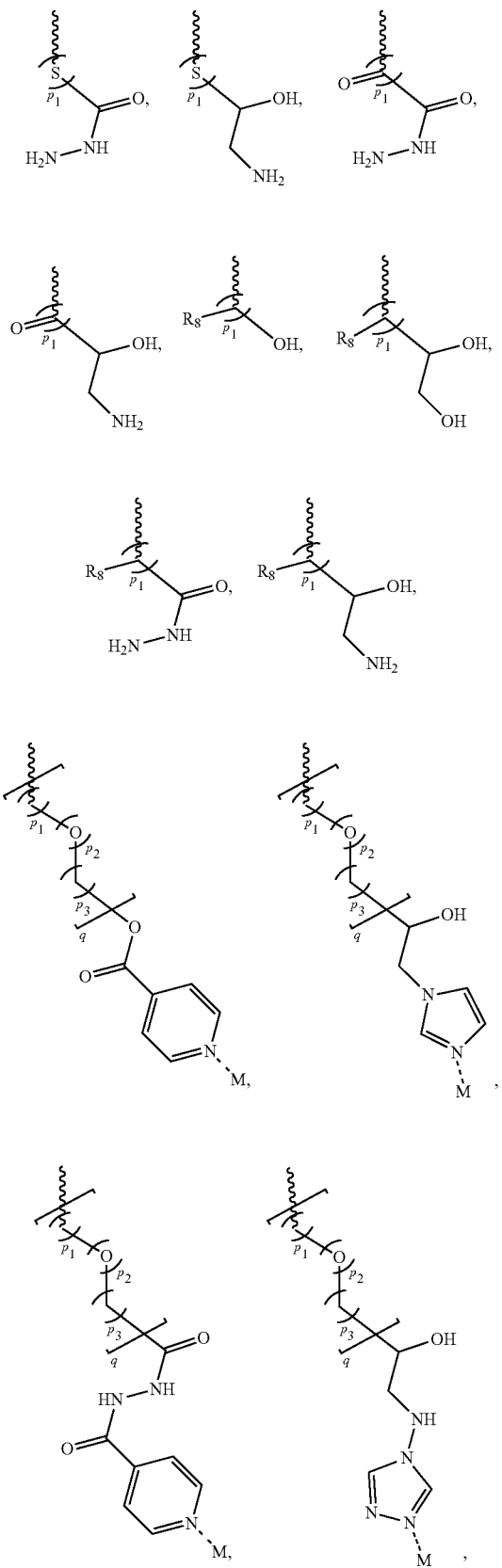
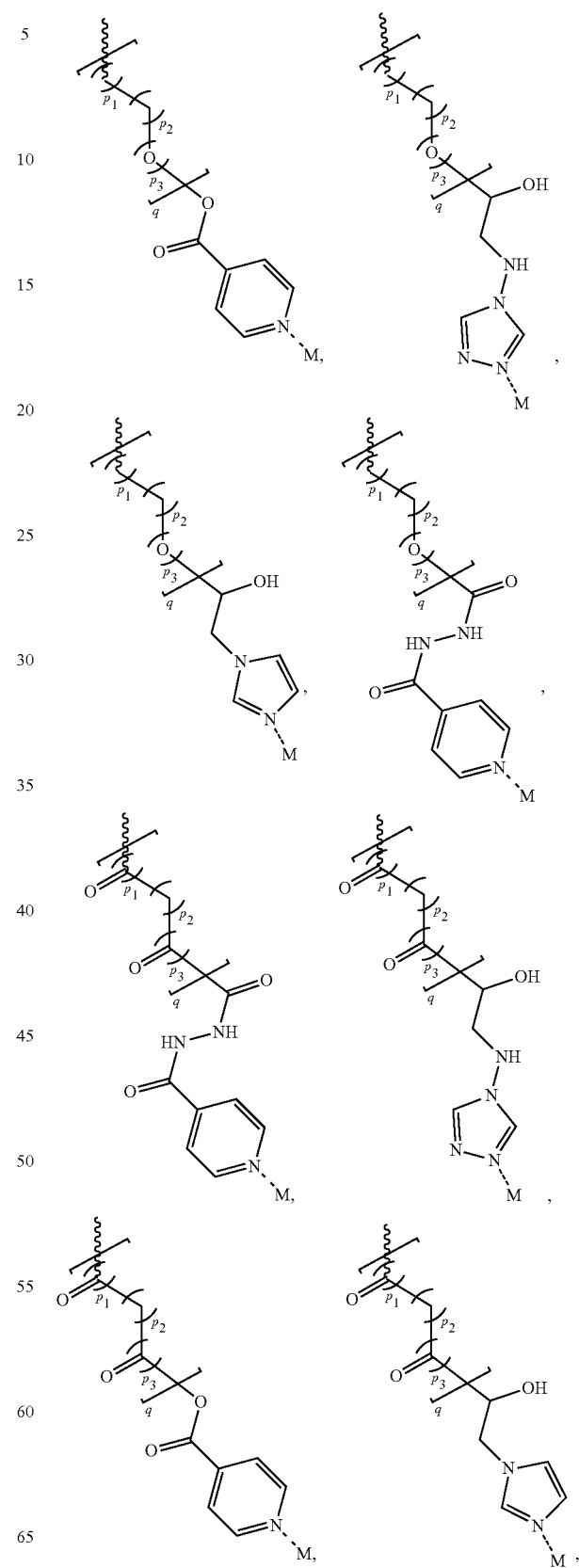

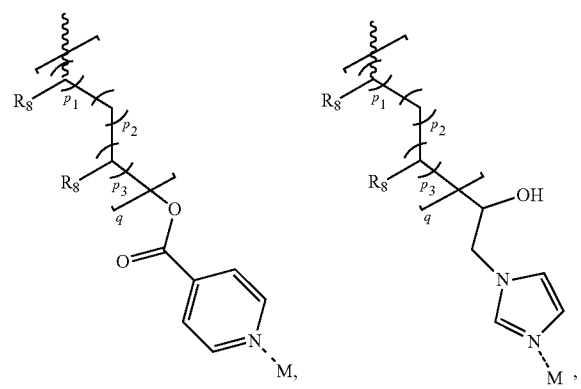
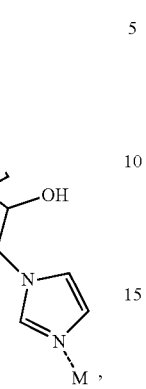
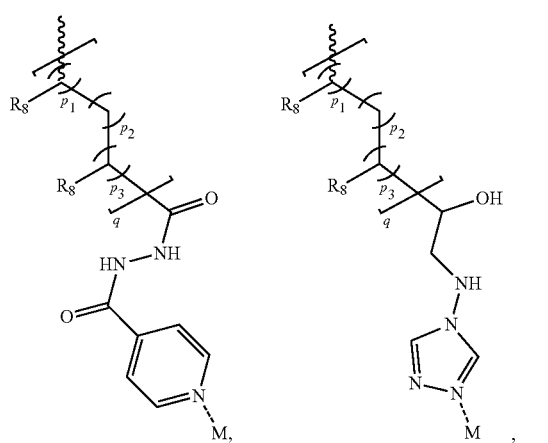
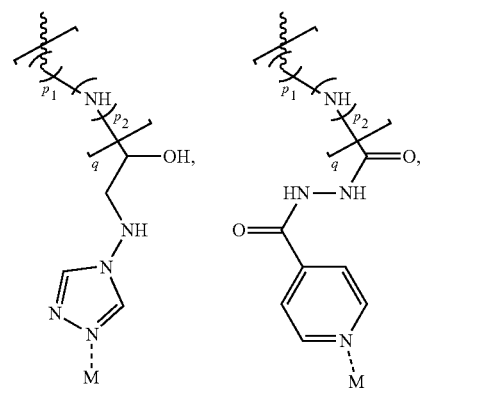
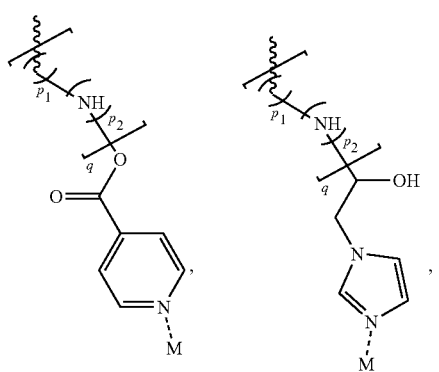
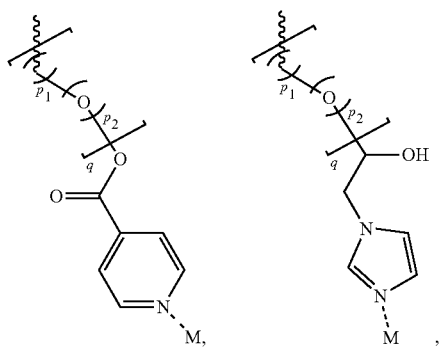
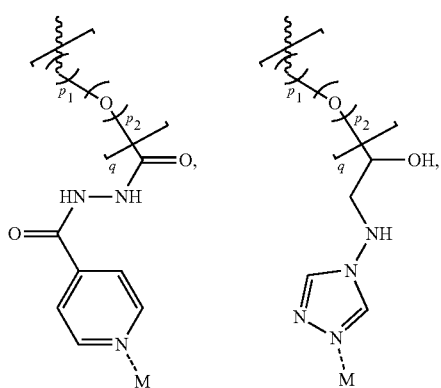
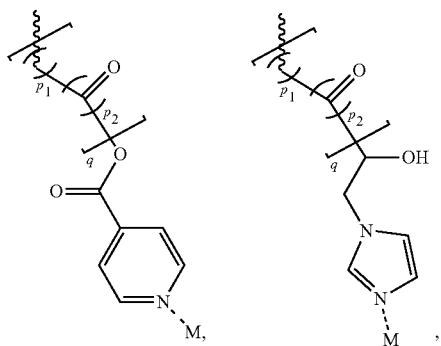
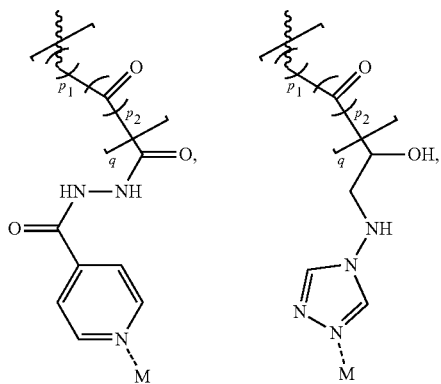

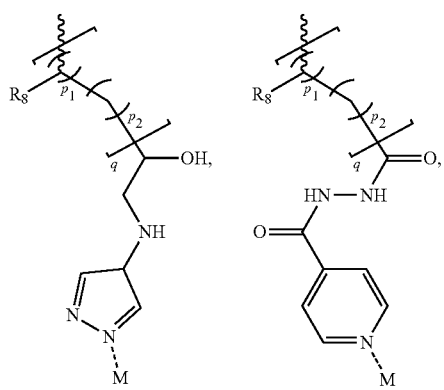
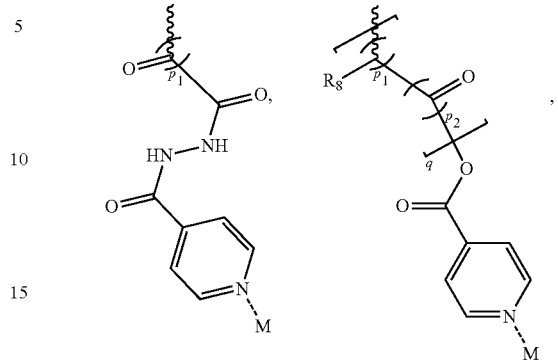
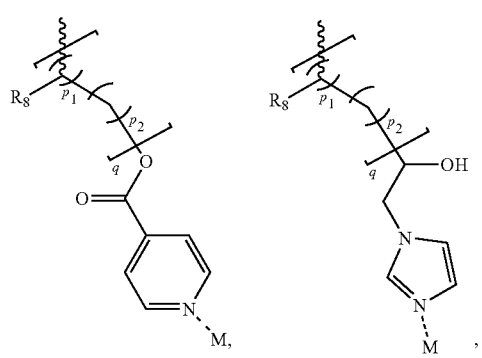
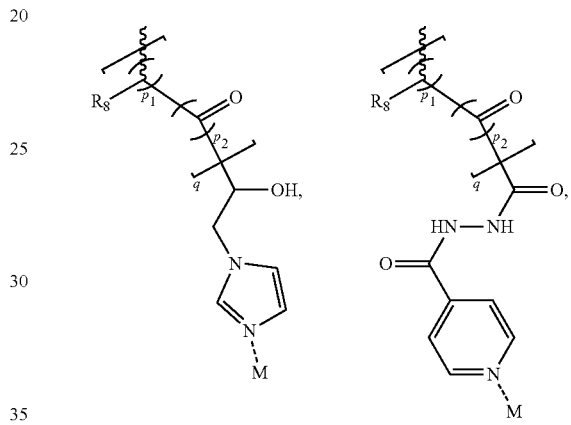
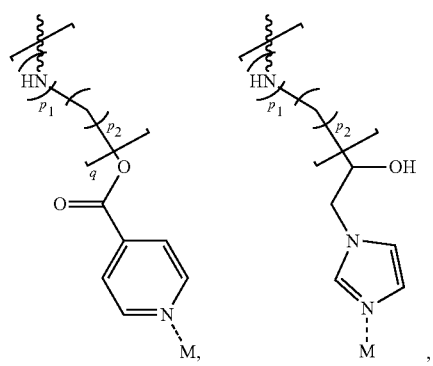
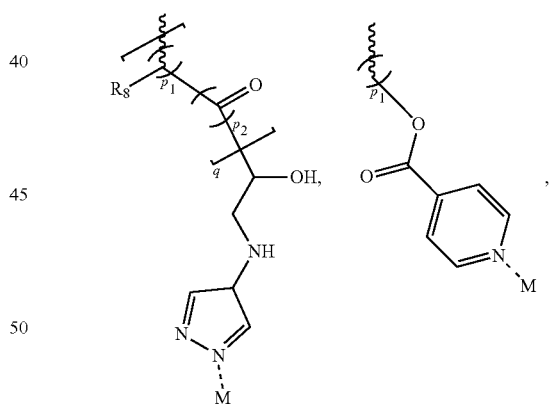
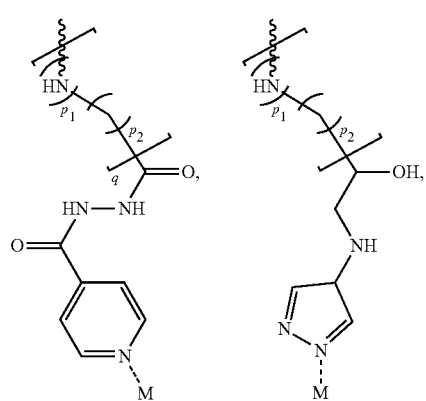
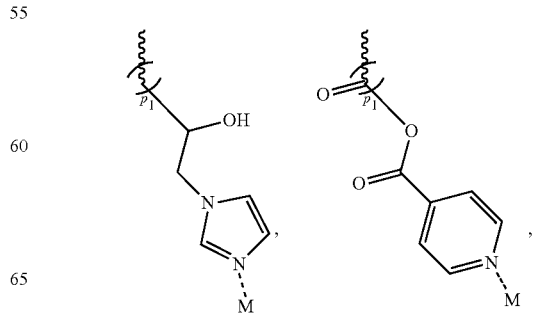

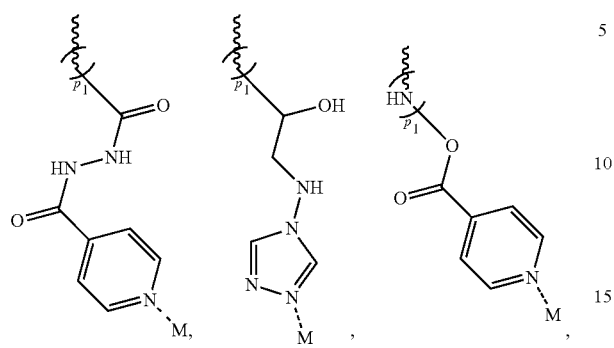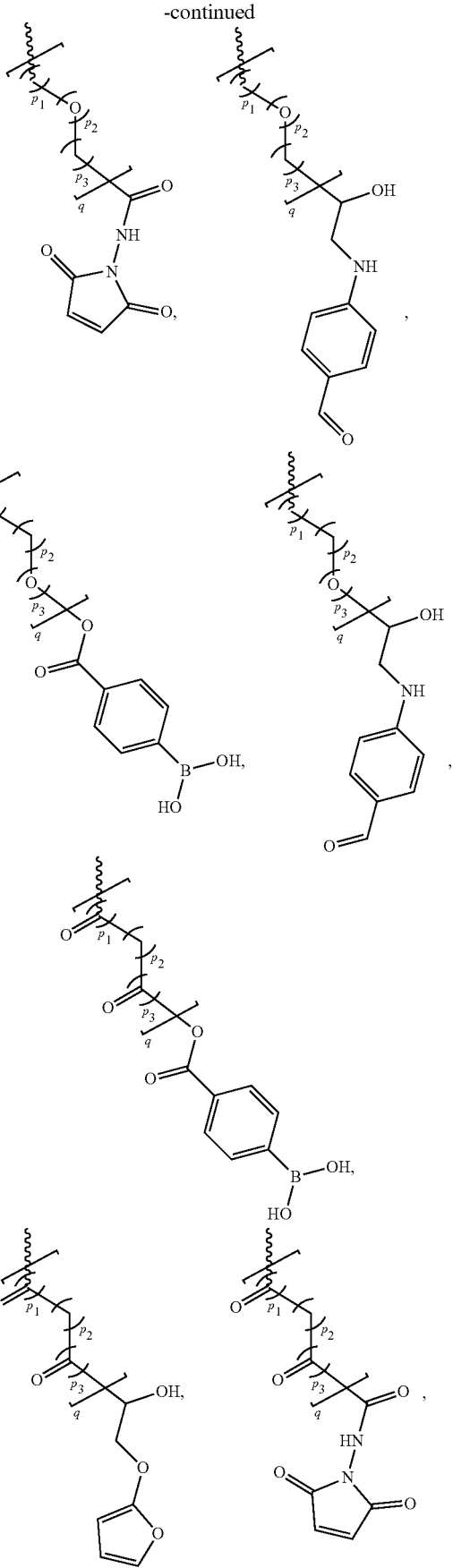

-continued
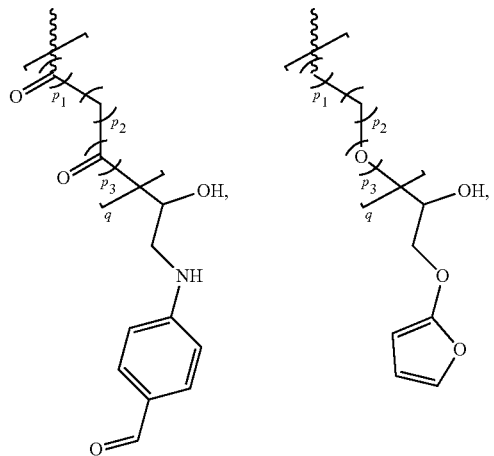
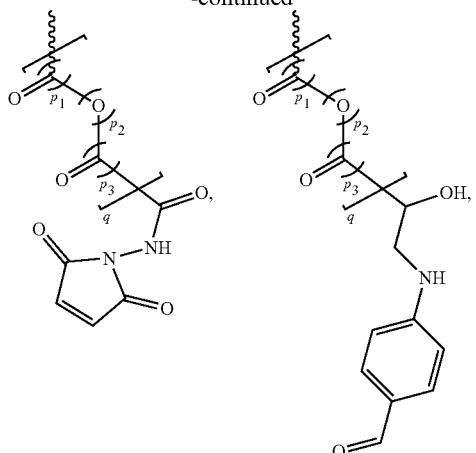
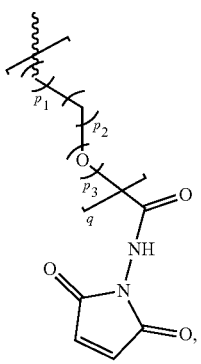
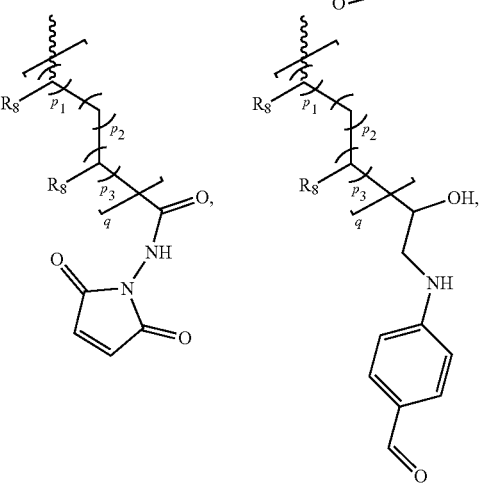
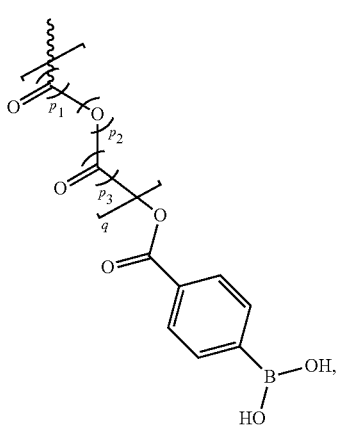
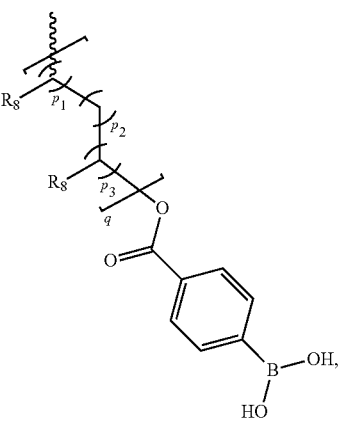
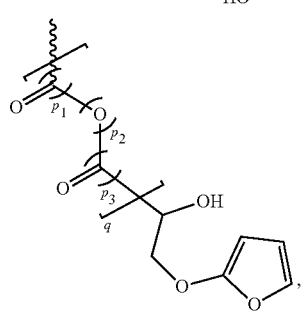
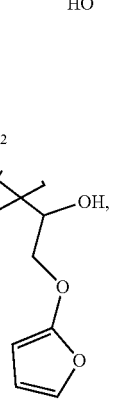

-continued
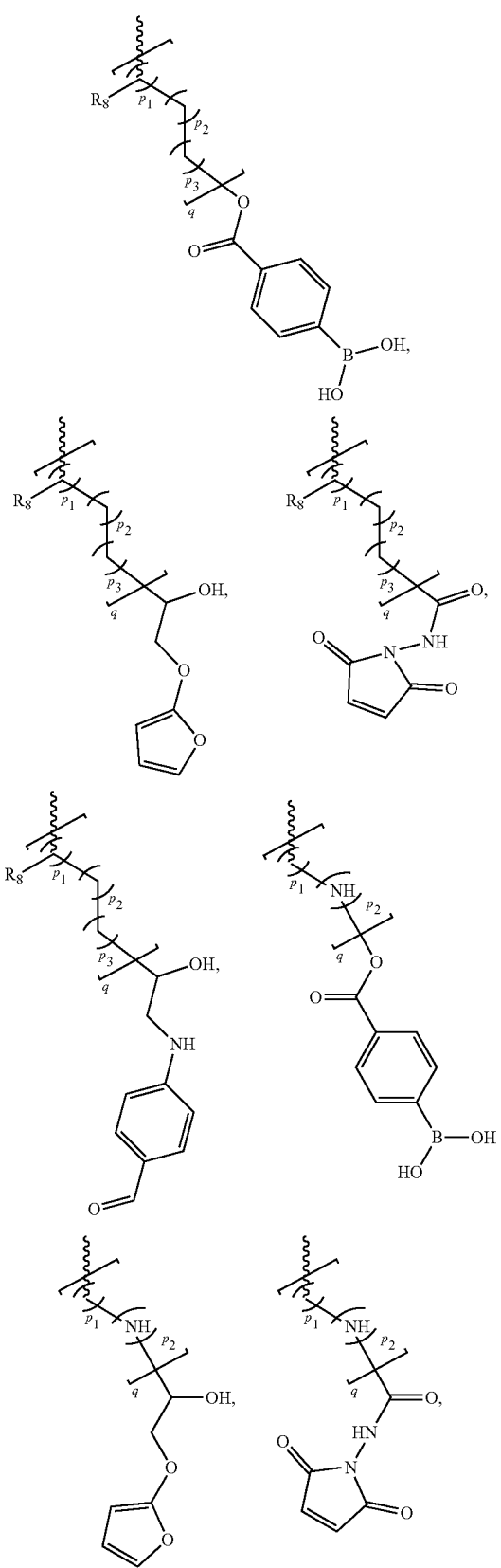
-continued
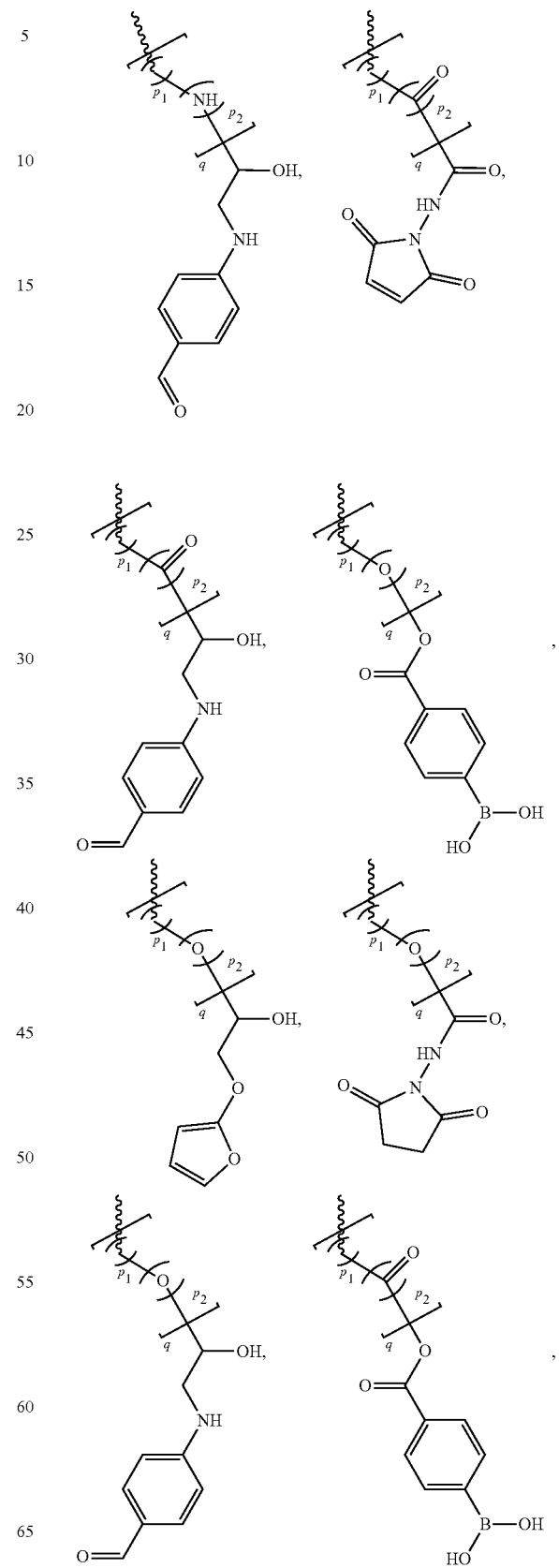

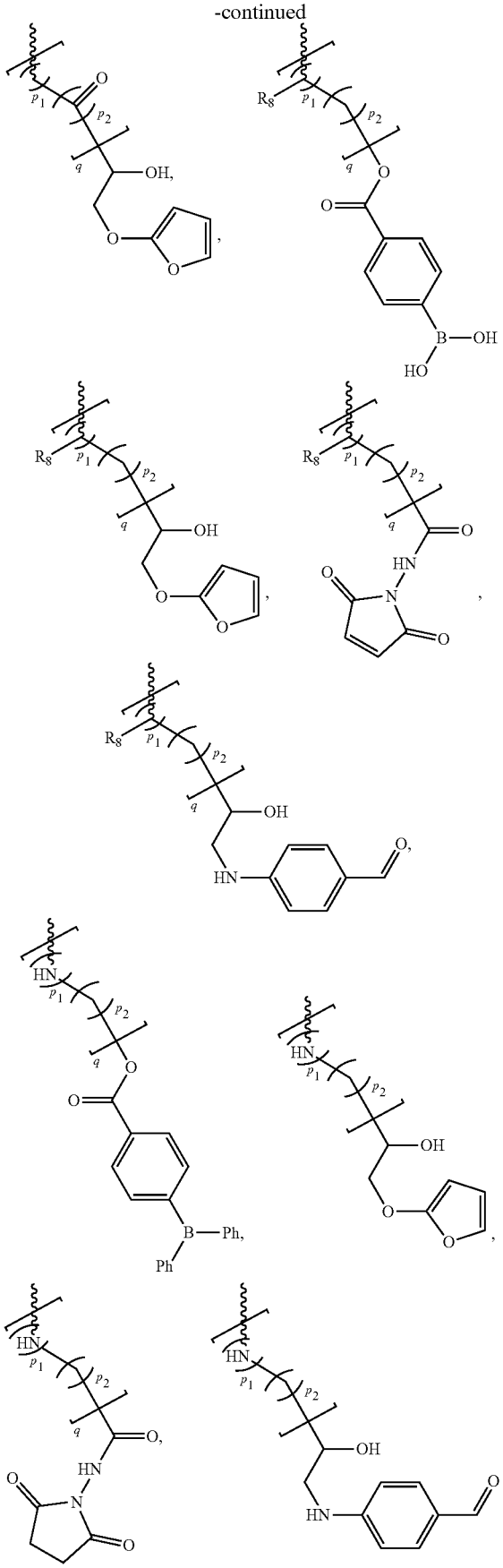

-continued

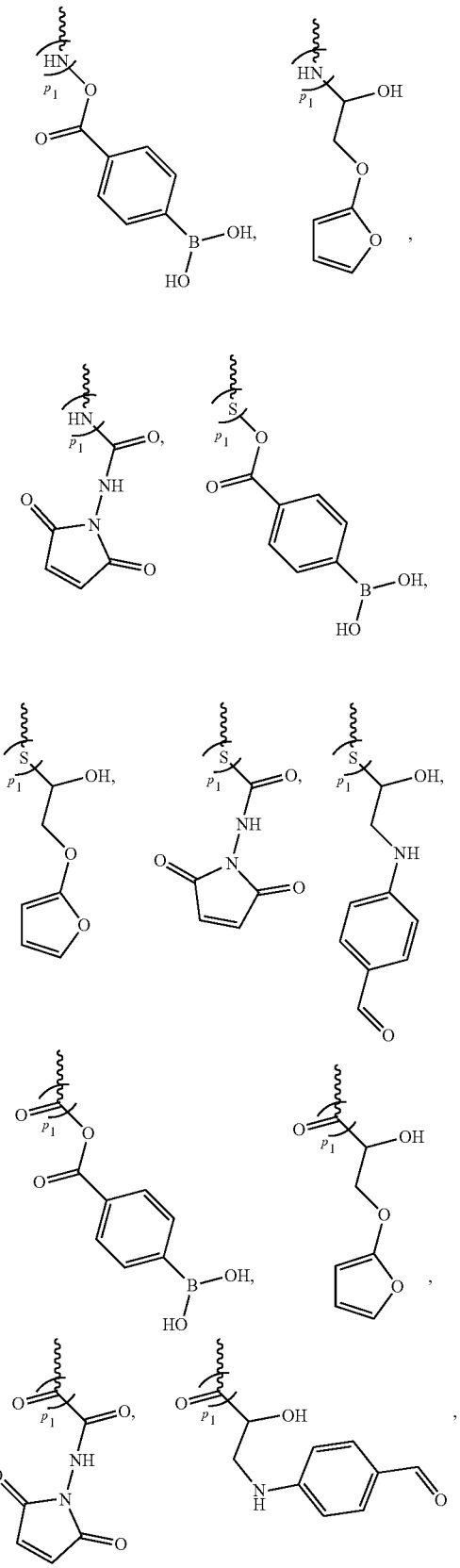

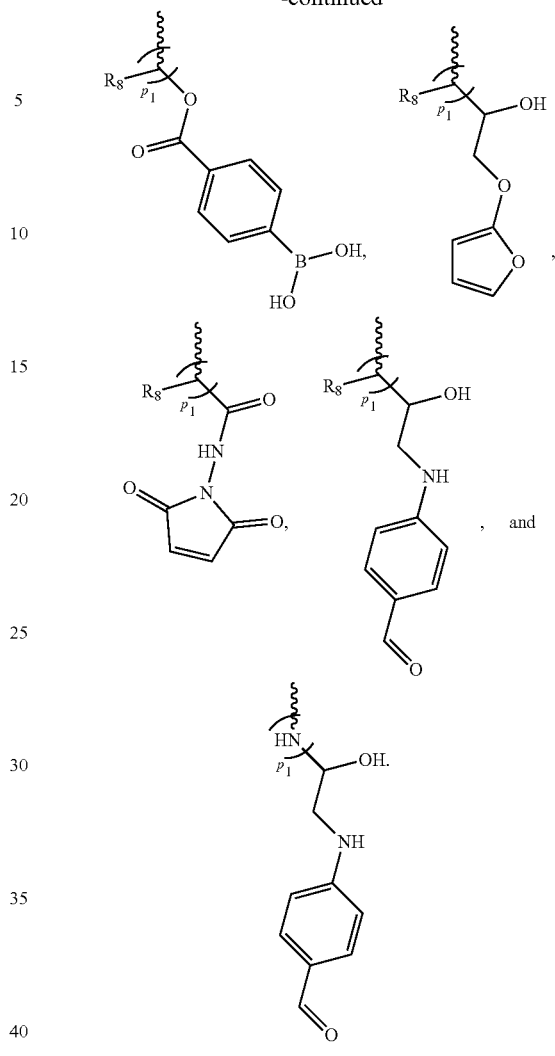

Another objective of the present invention is to provide a kind of precursors of the above polysiloxane, the precursors having the following structural formula:

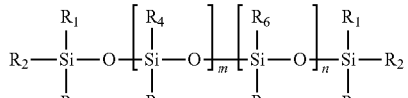

Formula I.

m is an integer between 0 and 10000. n is an integer between 0 and 10000. m and n cannot be equal to 0 simultaneously.

$R_1$-$R_7$ are the same or different. At least one of $R_1$-$R_7$ has a structure of Formula II, and the others are selected from an amino group, a hydroxyl group, a thiol group, a carboxyl group, a methoxyl group, a nitro group, a C1-C50 alkyl group or cycloalkyl group non-substituted or substituted by one or more hydroxyl groups, amino groups, thiol groups or halogen atoms, and a phenyl group or naphthyl group non-substituted or substituted by one or more C1-C50 alkyl groups, C1-C50 alkoxy groups, hydroxyl groups, amino groups, thiol groups or halogen atoms.

Formula II

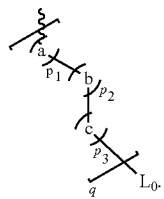

In Formula II, a, b and c are the same or different, and represent units formed by connecting one or more of —$CH_2$—, —NH—, —O—, —S—, —COO—, —CO— and —CH($R_8$)— in any order. $R_8$ represents a hydrogen atom or an amino group, a hydroxyl group, a thiol group, a carboxyl, a methoxyl group, a C1-C50 alkyl group or cycloalkyl group non-substituted or substituted by one or more hydroxyl groups, amino groups, thiol groups or halogen atoms, and a phenyl group or naphthyl group non-substituted or substituted by one or more C1-C50 alkyl groups, C1-C50 alkoxy groups, hydroxyl groups, amino groups, thiol groups or halogen atoms. $p_1$, $p_2$ and $p_3$ are the same or different, and are integers between 0 and 500. q is an integer between 0 and 500.

$L_0$ is selected from

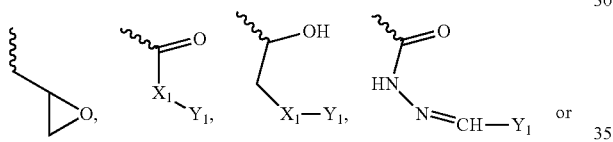 or

$X_1$ represents —$CH_2$—, —NH—, —O—, —S—, —COO— or —CO—.

$Y_1$ represents:

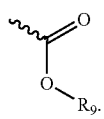

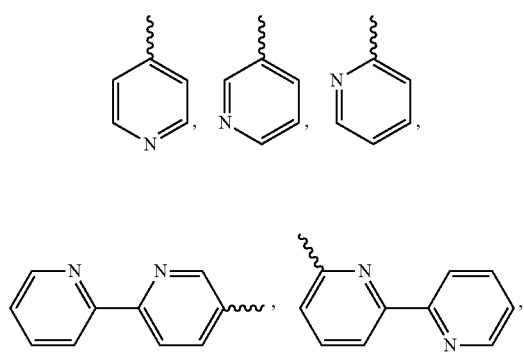

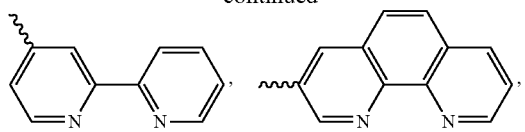

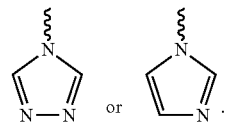

$R_9$ represents a hydrogen atom or an amino group, a hydroxyl group, a thiol group, a carboxyl group, an alkoxy group, a nitryl group, a C1-C50 alkyl group or cycloalkyl group non-substituted or substituted by one or more hydroxyl groups, amino groups, thiol groups or halogen atoms, and a phenyl group or naphthyl group non-substituted or substituted by one or more C1-C50 alkyl groups, C1-C50 alkoxy groups, hydroxyl groups, amino groups, thiol groups or halogen atoms.

Preferably, $R_9$ represents a hydrogen atom, an amino group, a hydroxyl group, a methoxyl group, a methyl group, an ethyl group, a propyl group, a butyl group or a phenyl group.

When $L_0$ is selected from

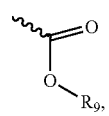

the modified polysiloxane with a hydroxyl group, an amino group, a thiol group, a pyridyl group, an imidazolyl group, a carbazolyl group, a bipyridyl group, an o-phenanthroline group or other functionalized groups can be further prepared by utilizing cyclic ether to open the ring.

When $L_0$ is selected from

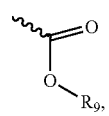

the polysiloxane functionalized with groups including a carboxyl group, an amide group, a hydrazide group and a formyl group can be prepared through hydrolysis, aminolysis, hydrazinolysis and reduction reactions.

When $L_0$ is selected from

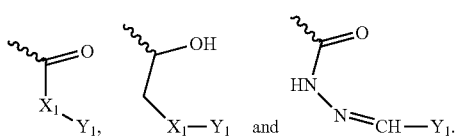

the modified polysiloxane having a reversible coordination bond can be prepared through coordination with metal ions.

According to a preferable technical solution of the present invention, the modified polysiloxane is selected from:

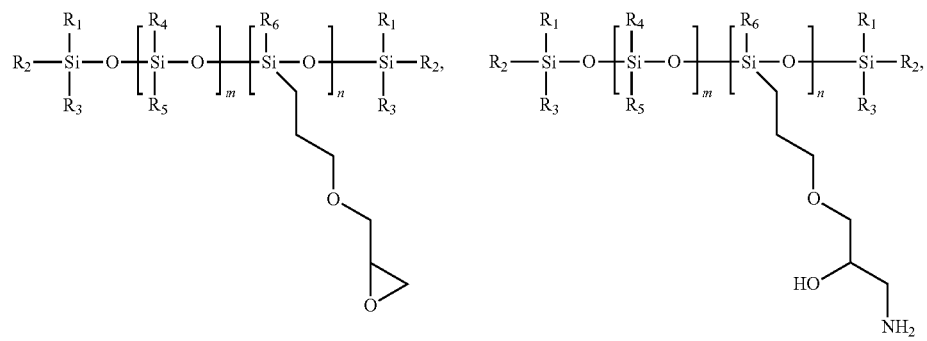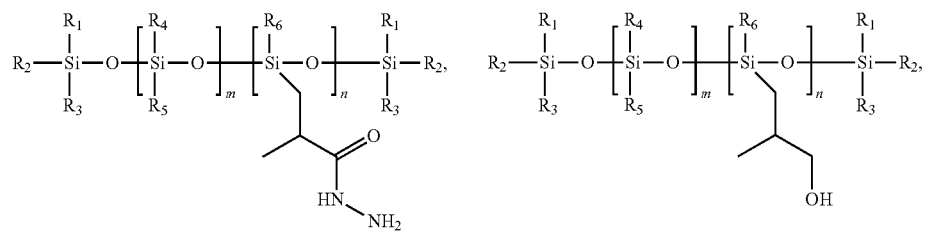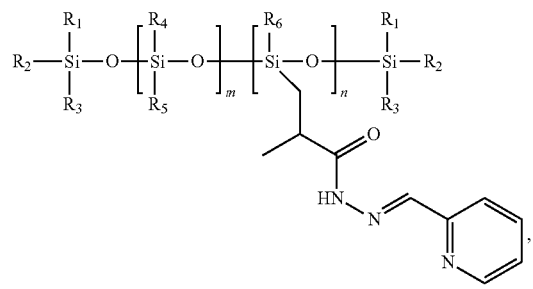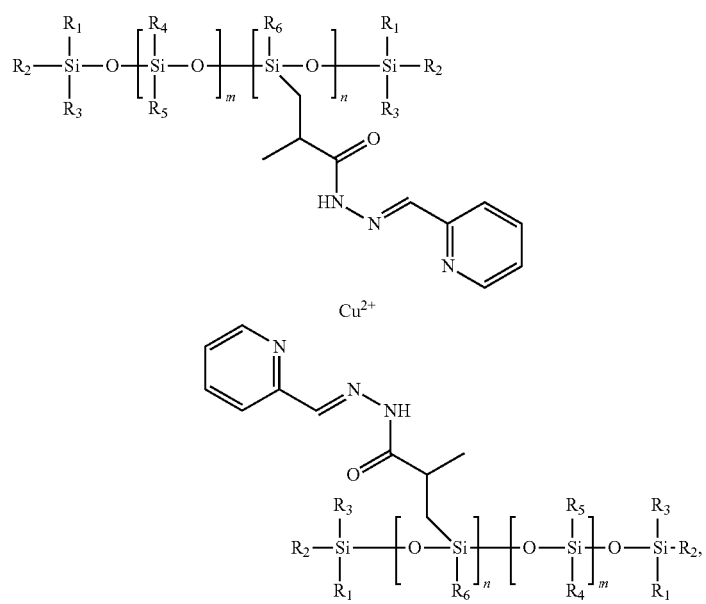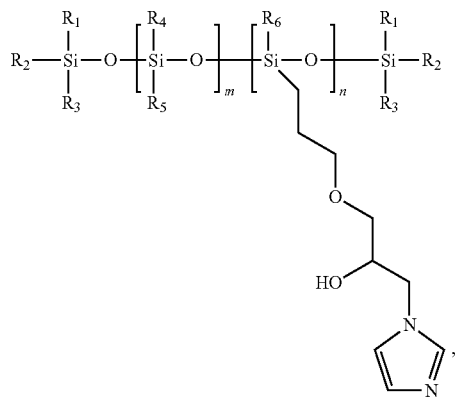

-continued

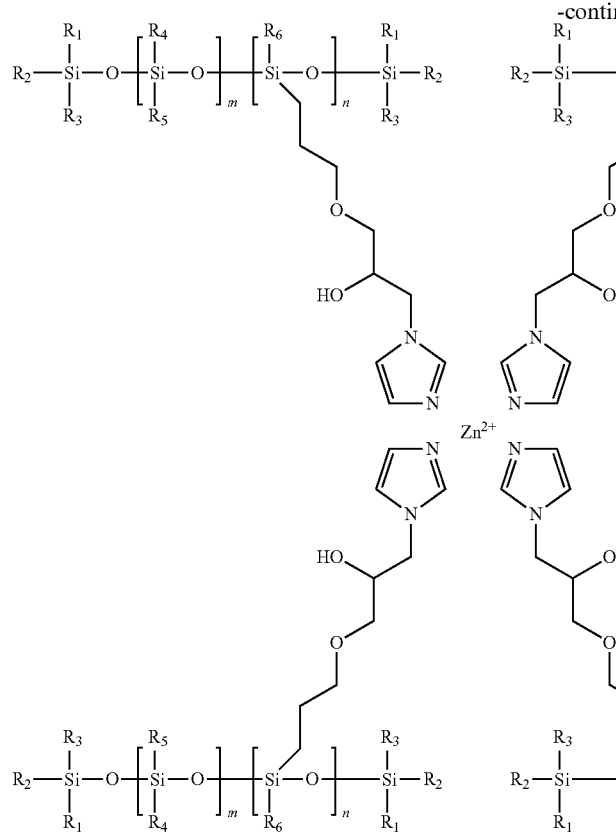
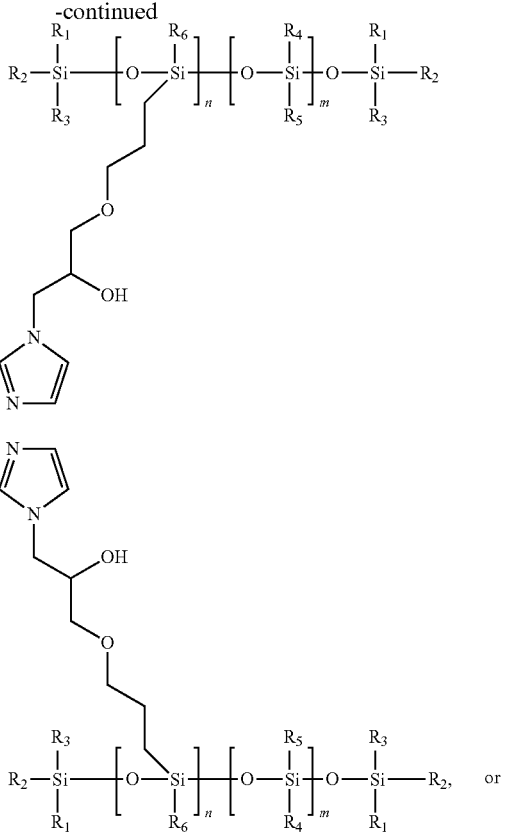

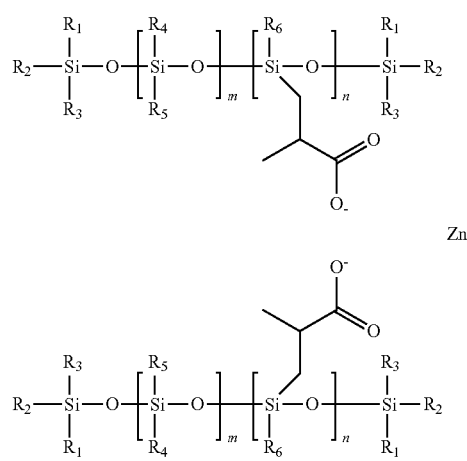
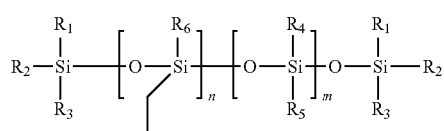, or

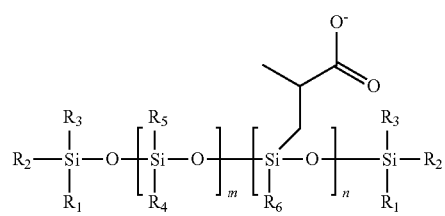
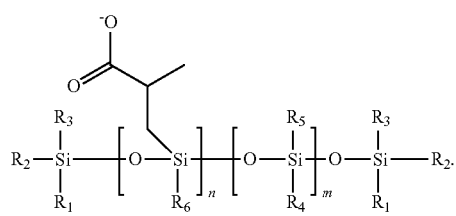.

Another objective of the present invention is to provide application of the modified polysiloxane of the present invention in preparation of a temperature-sensitive material, and more particularly, in preparation of a temperature-sensitive fast shaping material, and in preparation of medical external fixation materials, orthopedic materials, packaging materials and the like.

Another objective of the present invention is to provide a temperature-sensitive material, which includes the modified polysiloxane of the present invention. According to the temperature-sensitive material, when $L_0$ represents a group having a reversible chemical bond system based on a hydrogen bond or a coordination bond, the material includes one or more of the modified polysiloxane.

When $L_0$ represents a group having a reversible chemical bond system based on a covalent bond, the material includes: modified polysiloxane with $L_0$ respectively being

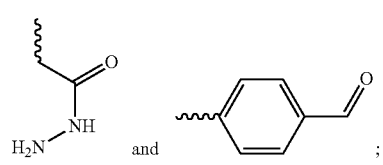 ;

or modified polysiloxane with $L_0$ respectively being

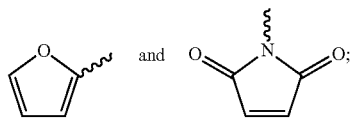

or modified polysiloxane with $L_0$ respectively being

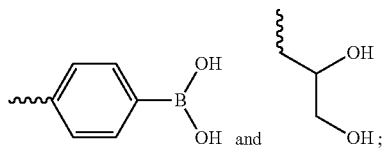

or modified polysiloxane with $L_0$ respectively being

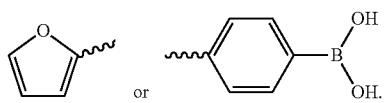

When $L_0$ is

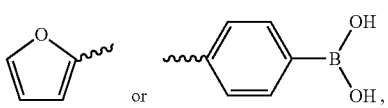

$L_0$ itself can form a reversible covalent bond.

According to a preparation method of the temperature-sensitive material of the present invention,

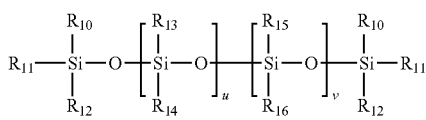

is used as a raw material. u is an integer between 0 and 10000. v is an integer between 0 and 10000. u and v cannot be equal to 0 simultaneously. $R_{10}$-$R_{16}$ are the same or different. At least one of $R_{10}$-$R_{16}$ is H or an alkenyl group (such as a vinyl group), and others are selected from an amino group, a hydroxyl group, a thiol group, a carboxyl group, a methoxyl group, a nitro group, a C1-C50 alkyl group or cycloalkyl group non-substituted or substituted by one or more hydroxyl groups, amino groups, thiol groups or halogen atoms, and a phenyl group or naphthyl group non-substituted or substituted by one or more C1-C50 alkyl groups, C1-C50 alkoxy groups, hydroxyl groups, amino groups, thiol groups or halogen atoms. A group having a reversible chemical bond system is introduced in a position of a substituent group which is H or an alkenyl group (such as a vinyl group) in the structure. The reversible chemical bond system is selected from a reversible chemical bond system based on a hydrogen bond, a coordination bond or a covalent bond. For example, the method can include: (1) modifying an industrial product of hydrogen-containing silicone oil or vinyl silicone oil through reactions such as addition, elimination, hydrolysis, substitution and cycloaddition, so as to obtain a PDMS material containing corresponding functional groups. Synthesis methods of different functional groups can be the same or different, when a side reaction is caused by the introduced functional groups, the functional groups need to be correspondingly protected, and a deprotection reaction is performed after the modification is competed; and (2) adding a catalyst, an auxiliary agent, a solvent and the like into one or more of the prepared polymer materials with specific functional groups, and preparing the corresponding temperature-sensitive material through processes of dissolving (melting), mixing, stirring, heating, desolventizing, cooling and the like.

The temperature-sensitive material of the present invention has the following mechanism:

(1) For the polysiloxane with reversible hydrogen bonds, since the hydrogen bond are highly sensitive to temperature, when the temperature changes, the intra-molecular and intermolecular hydrogen bond interaction will be enhanced or weakened, so that the mechanical strength of the material obviously changes as the temperature changes. Therefore, the change of the mechanical properties of the material can be realized by controlling the temperature.

For example,

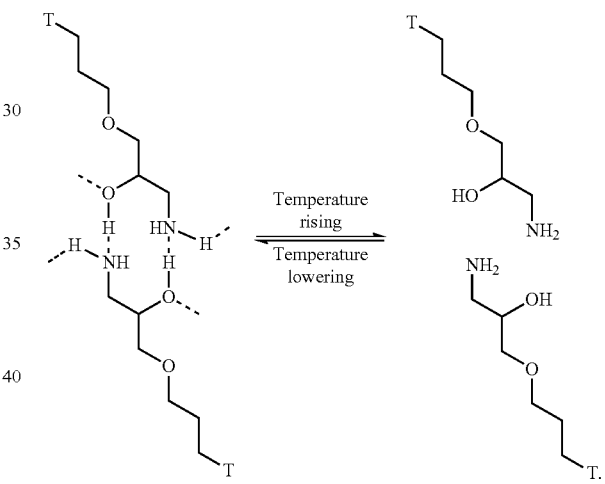

The group T has the following structural formula:

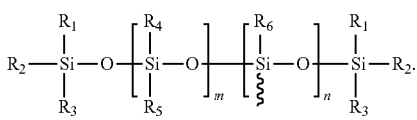

(Illustration is performed by taking a group having a reversible chemical bond in a position $R_7$ as an example. Practically, one or more of $R_1$-$R_7$ can be the group having the reversible chemical bond, and the descriptions thereof are omitted herein).

(2) For the polysiloxane with reversible coordination bonds, since the coordination bond are highly sensitive to temperature, when the temperature changes, the strength of the coordination interaction between the ligand and the metal ions in the polymer chains correspondingly changes, so that the mechanical strength of the material correspondingly changes. Therefore, the change of the mechanical properties of the material can be realized by controlling the temperature.

For example,

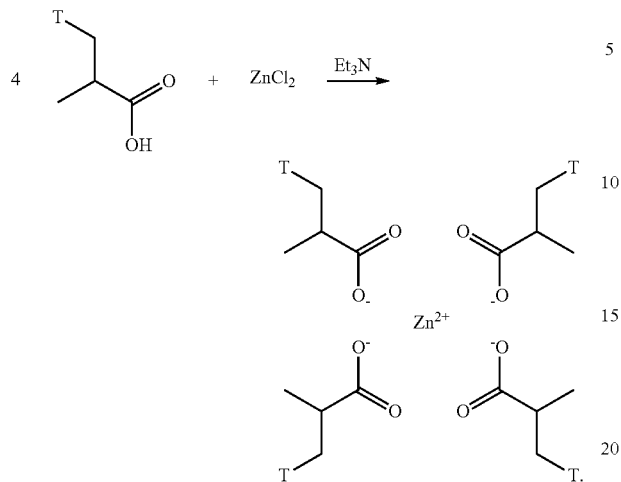

The group T has the following structural formula:

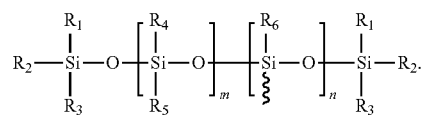

(Illustration is performed by taking a group having a reversible chemical bond in a position $R_7$ as an example. Practically, one or more of $R_1$-$R_7$ can be the group having the reversible chemical bond, and the descriptions thereof are omitted herein).

(3) For the polysiloxane with reversible covalent bonds, since the selected covalent bonds are highly sensitive to temperature, when the temperature changes, the reversible covalent bond group introduced in the polymer chain will be broken or formed, so that the mechanical strength of the material correspondingly changes. Therefore, the change of the mechanical properties of the material can be realized by controlling the temperature.

For example,

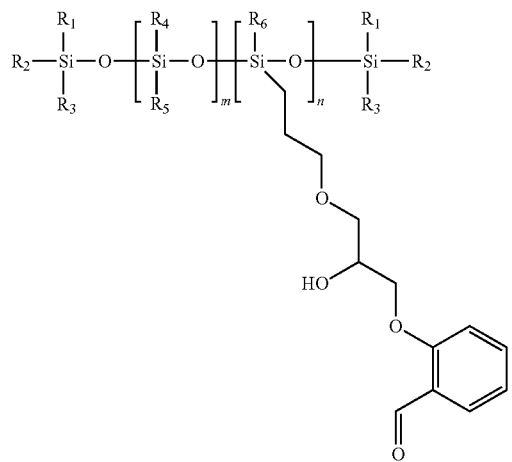

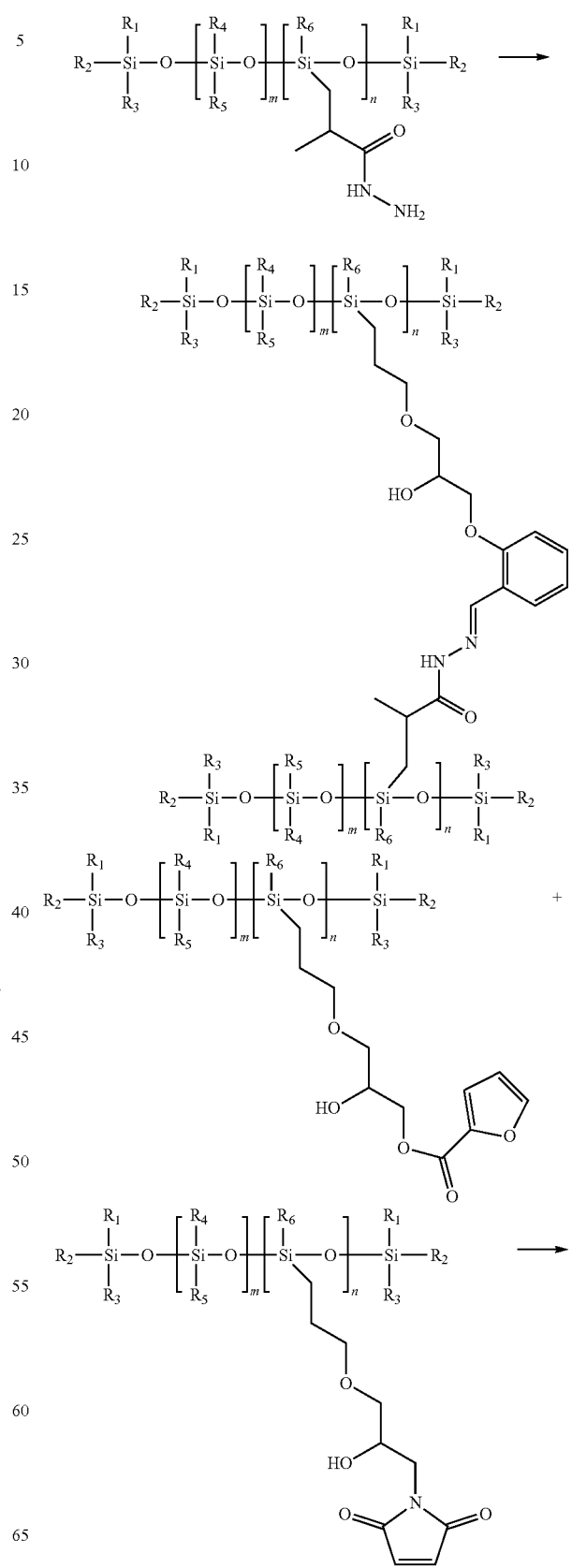

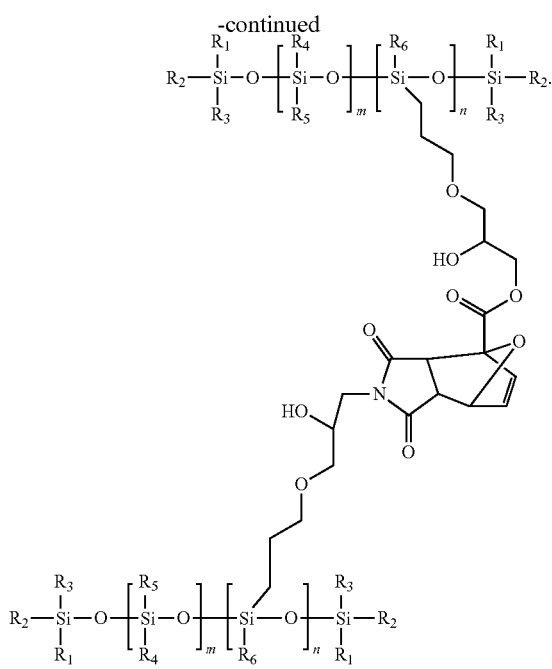

When $L_0$ is

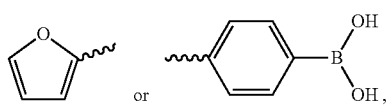

$L_0$ itself can form a reversible covalent bond, for example:

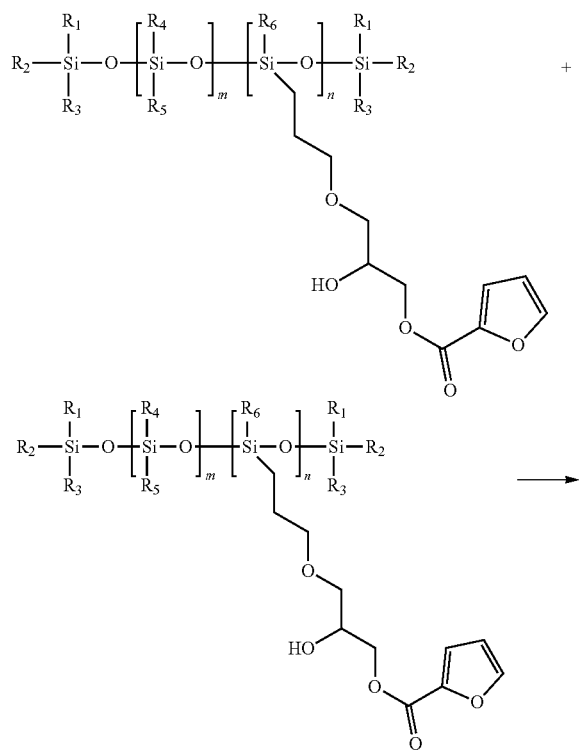

The above temperature-sensitive material can further include one or more of a polymer additive, a plasticizer, a toughening agent, a stabilizing agent, a lubricating agent, a nanometer additive, filler, a color additive and a medicinal component additive.

The polymer additive is a conventional polymer material, and can be one or more of the following polymer materials:

polyester, including but not limited to polyethylene terephthalate (PET), polybutylene terephthalate (PBT), and polytrimethylene terephthalate (PTT);

polyamide, including but not limited to Polyhexamethylene adipamide (Nylon-66) and polycaprolactam;

polyacrylonitrile and derivatives thereof;

aramid fiber, including but not limited to polyisophthaloyl metaphenylene diamine (PMIA), and poly-p-phenylene terephthamide (PPTA, Kevlar);

polyurethane, including but not limited to polyester chain types and polyether chain types;

plastics, including but not limited to polyethylene, polypropylene, polyvinyl chloride, polymethyl methacrylate, polystyrene, polytetrafluoroethylene, polyvinylidene fluoride, phenolic resin and ABS resin; and rubber, including natural rubber and synthetic rubber, including but not limited to butadiene styrene rubber, cis-polybutadiene, isoprene rubber, chloroprene rubber, ethylene propylene rubber, nitrile butadiene rubber, silicone rubber, fluororubber and polyurethane rubber.

The plasticizer, the type of which is not particularly limited, can be any plasticizer well-known to those skilled in the art, is preferably phthalate esters (PAEs), more preferably one or more of di-n-octyl phthalate (DNOP or DnOP), butyl benzyl phthalate (BBP), di-sec-octyl phthalate (DCP), dicyclohexyl phthalate (DCHP), dibutyl phthalate (DBP), diisobutyl phthalate (DIBP), dimethyl phthalate (DMP), diethyl phthalate (DEP), diisononyl phthalate (DINP) and di-iso-decylphthalate (DIDP), and can also be one or more of chlorinated paraffin, epoxidized soybean oil, dioctyl adipate or other aliphatic ester.

The toughening agent includes but is not limited to one or more of polybutadiene rubber, ethylene-propylene-diene rubber, ethylene-octene copolymers and dynamic vulcanized rubber.

The stabilizing agent includes but is not limited to one or more of lead phosphite, tribasic lead sulfate, dibasic lead stearate, calcium stearate, barium stearate, zinc stearate, di-n-butyltin dilaurate, and di-n-butyltin monobutyl maleate.

The lubricating agent includes but is not limited to one or more of stearic acid, calcium stearate, barium stearate, lead stearate, liquid paraffin or silicone oil.

The nanometer additive includes but is not limited to one or more of various nanometer materials, nanometer clay, nanometer fiber, nanometer titanium dioxide, nanometer barium titanate, aluminum oxide, silicon oxide, boron nitride and silicon nitride.

The filler is pharmaceutically common filler, including but not limited to one or more of textile fabrics, non-woven fabrics, calcium carbonate, pottery clay, mica powder, talcum powder, wood flour, plant fiber, glass fiber, carbon fiber, graphite, graphene and carbon nano tubes.

The color additive, the type of which is not particularly limited, can be any color additive well-known to those skilled in the art. In the present invention, the color additive is preferably one or more of a natural inorganic color additive, an artificial inorganic color additive, a natural organic color additive and an artificial organic color additive. In the present invention, the natural inorganic color additive is one or more of smoke black, chalk, vermillion, red clay, realgar, natural iron oxide, wollastonite, barite powder, talcum powder, mica powder and kaolin. The artificial inorganic color additive is one or more of titanium dioxide, charlton white, lead chromate yellow and iron blue. The natural organic color additive is one or more of rattan yellow, alizarin red and indigo blue. The artificial organic color additive is one or more of pigment scarlet powder, pale yellow, phthalocyanine blue and quinacridone.

The medicinal component additive, the type of which is not particularly limited, can be any medicinal component additive well-known to those skilled in the art.

According to a specific technical solution of the present invention, a temperature-sensitive fast shaping material includes the following ingredients in parts by weight:

the modified polysiloxane of the present invention: 30-100 parts;

a polymer additive: 0-50 parts; a plasticizer: 0-20 parts; a toughening agent: 0-20 parts; a stabilizing agent: 0-20 parts; a lubricating agent: 0-10 parts; a nanometer additive: 0-70 parts; filler: 0-50 parts; a color additive: 0-10 parts; and a medicinal component additive: 0-20 parts.

Preferably, the temperature-sensitive fast shaping material includes the following ingredients:

the modified polysiloxane of the present invention: 80 parts;

a polymer additive: 5 parts; a plasticizer: 3 parts; a toughening agent: 3 parts; a stabilizing agent: 2 parts; a lubricating agent: 1 part; a nanometer additive: 3 parts; filler: 1 part; a color additive: 1 part; and a medicinal component additive: 1 part.

According to a specific application example of the present invention, the temperature-sensitive fast shaping material can be prepared into a fast shaping support frame. A preparation method is as follows:

a. putting various ingredients into a blending apparatus to be blended according to weight parts, so as to obtain a uniform blended material;

b. extruding the blended material; and c. making an extruded material to present a required shape through 3D printing, cutting, injection molding or calendaring according to requirements.

The present invention has the following advantages:

Polysiloxane is a polymer with a main chain being silicon-oxygen bond (—Si—O—) repeating units, which has a very low glass transition temperature, and chain segments having very good movability and stability in normal state, and is one of optimum basic materials of temperature-sensitive polymer materials. However, the ordinary polysiloxane has poor temperature sensitivity. The present invention creatively uses polysioxane as a main chain to introduce a reversible chemical bond having temperature sensitivity by using a chemical method, so as to obtain a polymer material which is highly sensitive to temperature. By utilizing the temperature-sensitive properties of materials, functional materials with specific applications, such as medical external fixation materials, orthopedic materials, and packaging materials, can be obtained by using particular processing and preparation methods.

DETAILED DESCRIPTION

Now, a structure, a preparation method and a mechanism of a temperature-sensitive polymer material involved in the present invention and application thereof in a fast shaping external fixation support frame are further illustrated in conjunction with embodiments.

Embodiment 1 Temperature-Sensitive Polymer Material Based on Hydrogen Bond

Step 1: 150 g of anhydrous toluene was added into a dry four-neck flask with a temperature indicator, a condenser, a dropping funnel and an Ar introducing opening. 72 g of allyl glycidyl ether (0.63 mol) was added with stirring. Then, 37.5 g of polyalkylhydrosiloxane with a hydrogen content of 1.6 wt % ($M_n$ was about 3000, $R_1$-$R_6$ were methyl groups, m equals to 0, and n has a value in the range of 40 to 55, 0.6 mol per mol of Si—H) was added into a mixed reaction system of toluene and allyl glycidyl ether. Then, 20 mg of a Karstedt platinum catalyst (20 wt % Pt) was added dropwise into the mixed reaction system. After dropping, the temperature was controlled to be 50° C., and the reaction was continuously performed for 12 h. After the reaction was completed, reduced pressure distillation was adopted to obtain 105.5 g of polysiloxane functionalized with allyl glycidyl ether with a yield of 97.2%. Through $^1$H NMR characterization, the silicon hydrogen addition rate was 98.5%. The equation is as follows:

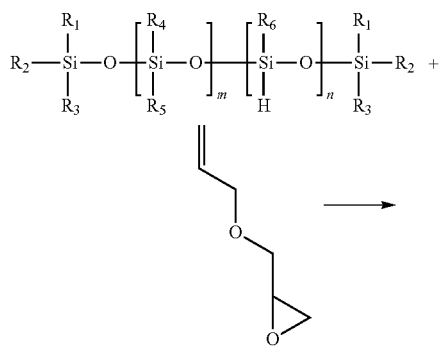

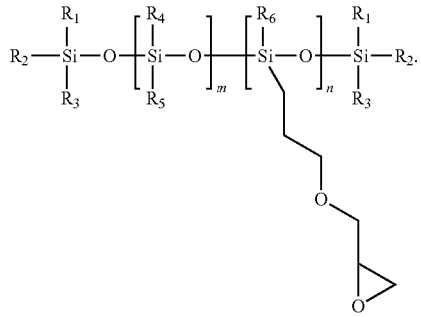

Step 2: In a dry four-neck flask with a temperature indicator, a condenser, a dropping funnel and an Ar introducing opening, 105.5 g of polysiloxane functionalized with allyl glycidyl ether obtained in Step 1 was dissolved into 150 mL of tetrahydrofuran. 100 mL of 25 wt % ammonium hydroxide solution was added into the system with stirring. The reaction temperature was controlled to be 50° C. The reaction was continuously performed for 12 h. After the reaction was completed, a tetrahydrofuran phase was extracted out. 100 mL of water was added into the extracted tetrahydrofuran to further purify the product. Anhydrous sodium sulfate was added for drying. Through reduced pressure distillation, 106.9 g of a final product of polysiloxane functionalized with amino group-hydroxyl group was obtained with a yield of 96.5%. The equation is as follows:

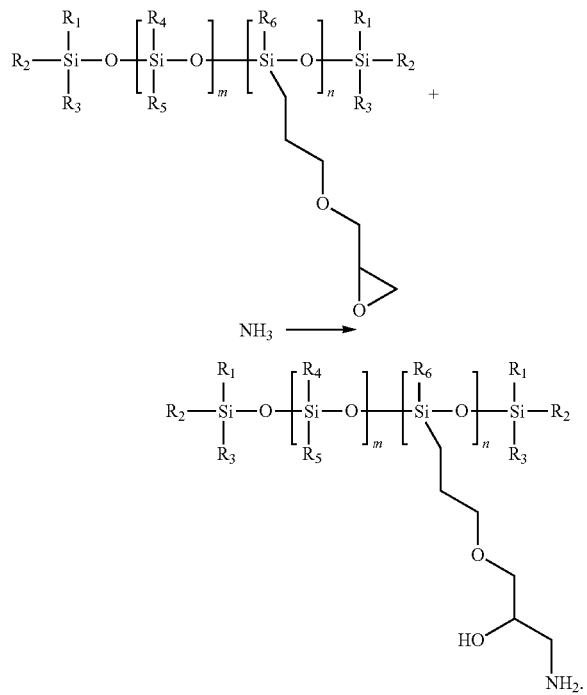

Upon the change of temperature, the hydrogen bond in the structure of the above polysiloxane functionalized with amino group-hydroxyl group changes as follows:

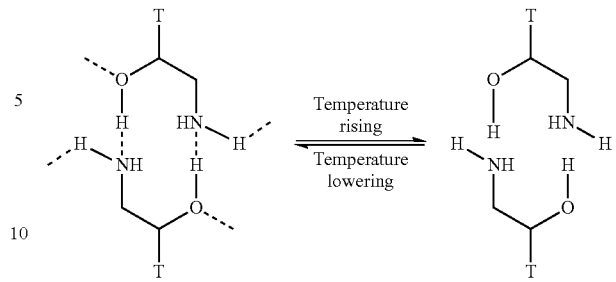

Dotted lines represent possibly existing hydrogen bond interaction in the polymer material. A group T has the following structural formula:

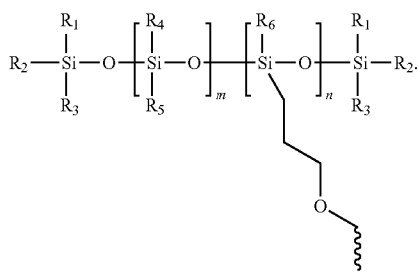

Figure 1:
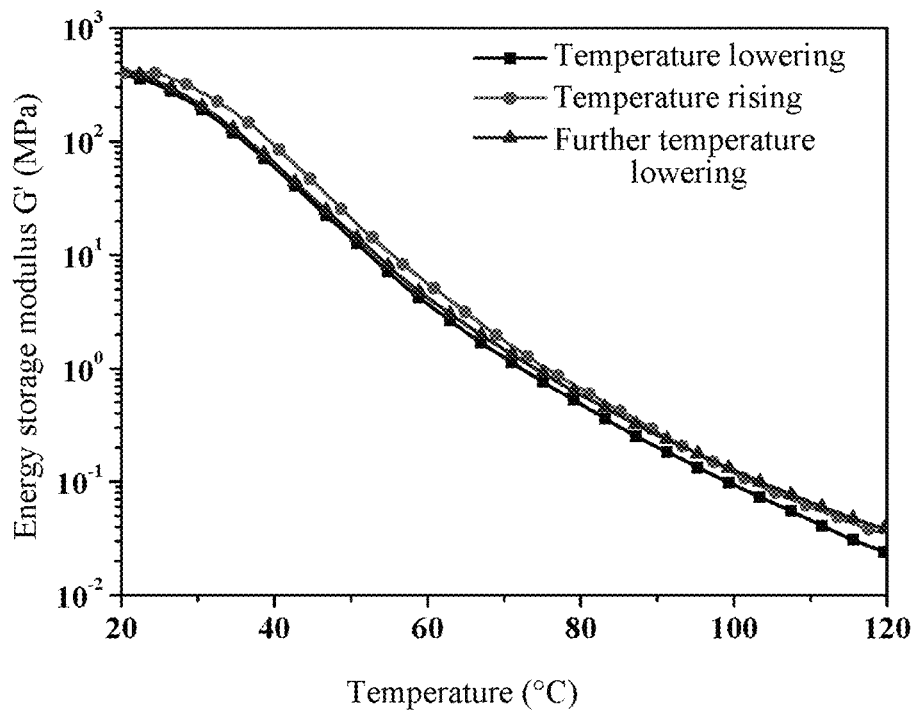
FIG. 1 is a temperature sensitivity characterization curve of a material obtained in Embodiment 1.

Temperature-Sensitive Property Characterization:

In order to illustrate the temperature-sensitive properties of the material, a temperature-sensitive index η of the material is defined as a change value of a corresponding mechanical strength (energy storage modulus) when the temperature rose from 20° C. to 120° C. (or a corresponding temperature lowering process) (η=G'(120)/G'(20)). The temperature-sensitivity curve is shown in FIG. 1. Specific parameters are shown in Table 1.

Figure 2:
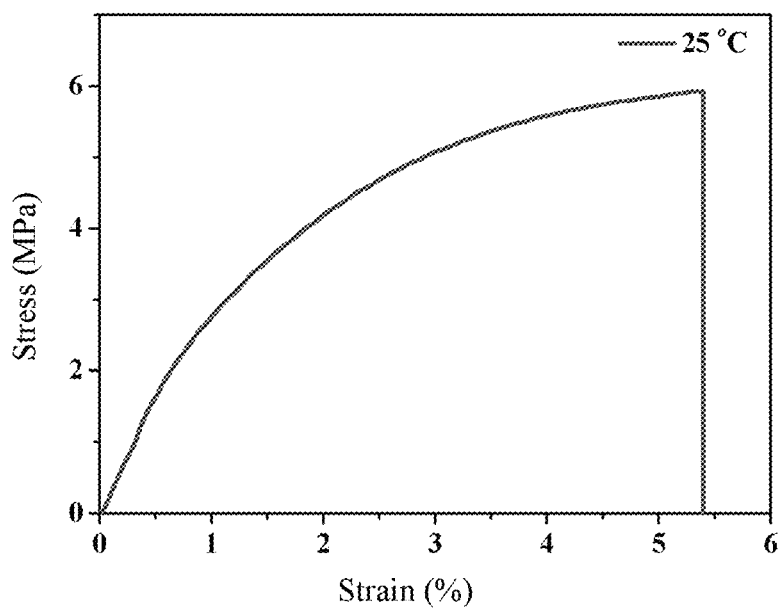
FIG. 2 is a mechanical property (stress-strain) curve of a material obtained in Embodiment 1.

Mechanical Property Characterization:

In order to illustrate the mechanical property of the temperature-sensitive material, a variable-temperature static stretching experiment was performed on the temperature-sensitive material to obtain a stress-strain curve. Through calculation, the Young modulus, the maximum stress and the maximum strain value of the material at a room temperature (25° C.) were obtained. For the product obtained in Embodiment 1, the mechanical property curve is shown in FIG. 2. Specific parameters are shown in Table 1.

The temperature-sensitive polymer material obtained in the present embodiment has a temperature-sensitive coefficient G'(120)/G'(20) of 16000, the Young modulus of 520 MPa, the maximum stress of 5.9 MPa, and the maximum strain of 5.4%. The above parameters show that the material has excellent temperature-sensitive coefficient, and also has good mechanical properties at the same time.

Embodiment 2 Temperature-Sensitive Polymer Material Based on Hydrogen Bond

Step 1: 150 g of anhydrous toluene was added into a dry four-neck flask with a temperature indicator, a condenser, a dropping funnel and an Ar introducing opening. 72 g of methyl methacrylate (0.72 mol) was added with stirring. Then, 75 g of polyalkylhydrosiloxane with a hydrogen content of 0.8 wt % ($M_n$ was about 4000, $R_1$-$R_6$ were methyl groups, m/n was 1/1, m has a value in the range of 30 to 40, and n has a value in the range of 30 to 40, 0.6 mol per mol of Si—H) was added into a mixed reaction system of toluene and methyl methacrylate. Then, 20 mg of a Karstedt platinum catalyst (20 wt % Pt) was added dropwise into the mixed reaction system. After dropping, the temperature was controlled to be 50° C., and the reaction was continuously performed for 12 h. After the reaction was completed, reduced pressure distillation was adopted to obtain 131.5 g of polysiloxane functionalized with methyl methacrylate with a yield of 97.2%. Through $^1$H NMR characterization, the silicon hydrogen addition rate was 97.5%. The equation is as follows:

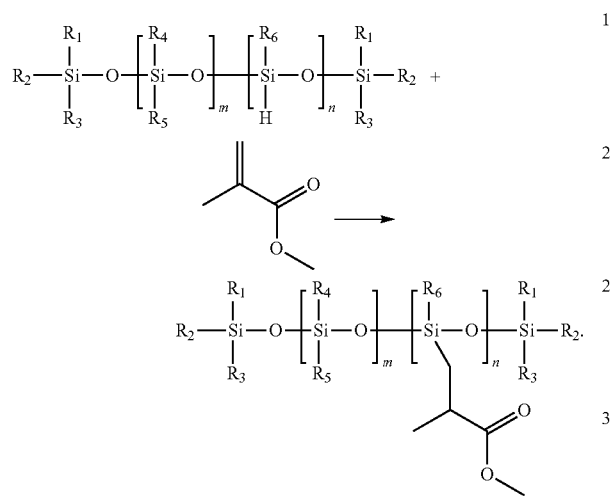

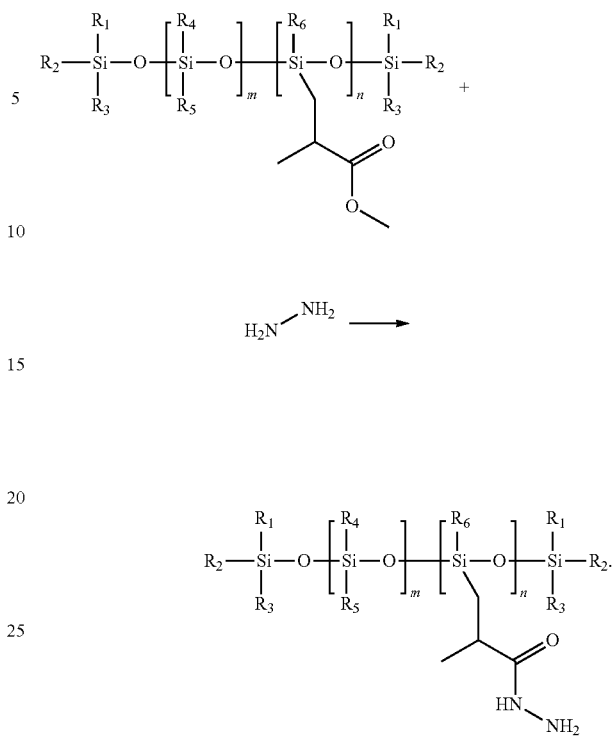

Upon the change of the temperature, the hydrogen bond in the structure of the above polysiloxane functionalized with hydrazide changes as follows:

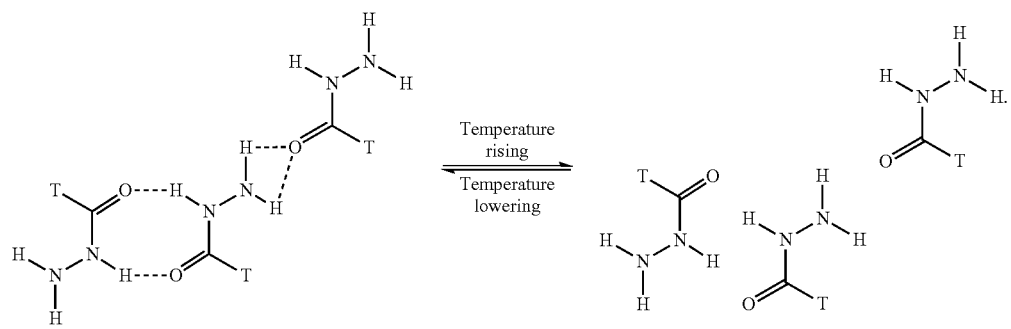

Step 2: In a dry four-neck flask with a temperature indicator, a condenser, a dropping funnel and an Ar introducing opening, 131.5 g of polysiloxane functionalized with methyl methacrylate obtained in Step 1 was dissolved into 150 mL of tetrahydrofuran. 100 mL of 80 wt % hydrazine hydrate solution was added into the system with stirring. The reaction temperature was controlled to be 50° C. The reaction was continuously performed for 12 h. After the reaction was completed, a tetrahydrofuran phase was extracted out. 100 mL of water was added into the extracted tetrahydrofuran to further purify the product. Through reduced pressure distillation, 118.5 g of a final product of polysiloxane functionalized with hydrazide was obtained with a yield of 95.6%. The equation is as follows:

Dotted lines represent possibly existing hydrogen bond interaction in the polymer material. A group T has the following structural formula:

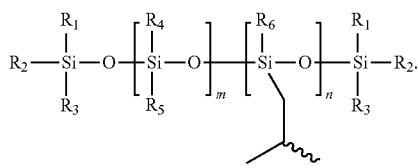

The temperature-sensitive property and mechanical property characterization of the product of the polysiloxane functionalized with reversible hydrogen bonds obtained in the present embodiment is similar to the properties of the product prepared in Embodiment 1. Detailed data is shown in Table 1. The temperature-sensitive polymer material obtained in the present embodiment has a temperature-sensitive coefficient G'(120)/G'(20) of 12000, the Young modulus of 610 MPa, the maximum stress of 6.2 MPa, and the maximum strain of 12.5%. The above parameters show that the material has excellent temperature-sensitive coefficient, and also has good mechanical properties at the same time.

Embodiment 3 Temperature-Sensitive Polymer Material Based on Hydrogen Bond

Step 1: In a dry four-neck flask with a temperature indicator, a condenser, a dropping funnel and an Ar introducing opening, 131.5 g of polysiloxane functionalized with methyl methacrylate obtained in Step 1 of Embodiment 2 was dissolved into 150 mL of tetrahydrofuran, and 36 g of lithium aluminum hydride was added into the system with stirring. The reaction temperature was controlled to be 25° C. The reaction was continuously performed for 12 h. After the reaction was completed, an organic phase was collected through filtration. Then, through reduced pressure distillation, the solvent was removed to obtain 112.3 g of a final product of polysiloxane functionalized with hydroxyl group with a yield of 93.8%. The equation is as follows:

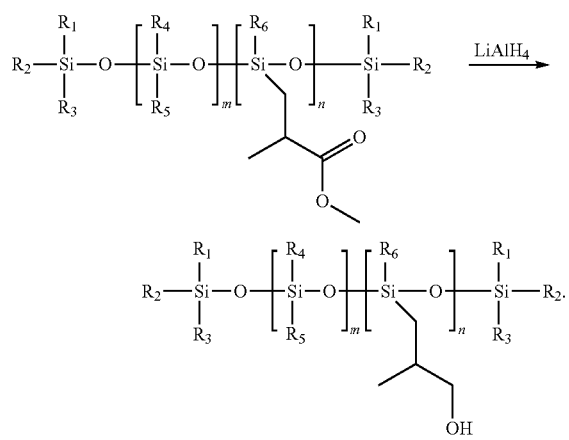

Upon the change of the temperature, the hydrogen bond in the structure of the above polysiloxane functionalized with hydroxyl group changes as follows:

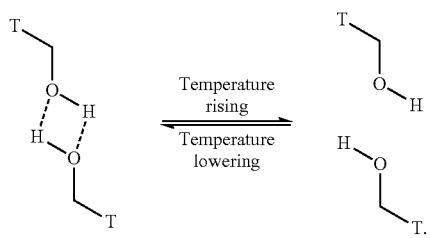

Dotted lines represent possibly existing hydrogen bond interaction in the polymer material. A group T has the following structural formula:

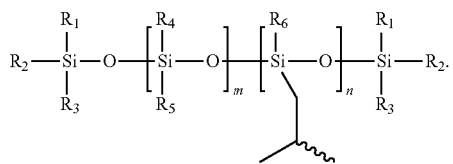

The temperature-sensitive property and mechanical property characterization of the product of the polysiloxane functionalized with reversible hydrogen bonds obtained in the present embodiment is similar to the properties of the product prepared in Embodiment 1. Detailed data is shown in Table 1. The temperature-sensitive polymer material obtained in the present embodiment has a temperature-sensitive coefficient G'(120)/G'(20) of 9000, the Young modulus of 380 MPa, the maximum stress of 4.6 MPa, and the maximum strain of 25.3%. The above parameters show that the material has excellent temperature-sensitive coefficient, and also has good mechanical properties at the same time.

Synthesis methods of other temperature-sensitive polymer materials based on a hydrogen bond are similar to those in Embodiment 1, Embodiment 2 and Embodiment 3, and only reaction raw materials need to be correspondingly replaced.

Embodiment 4 Temperature-Sensitive Polymer Material Based on Coordination Bond

Step 1: In a dry four-neck flask with a temperature indicator, a condenser, a dropping funnel and an Ar introducing opening, 85 g (about 0.5 mol) of a product of polysiloxane functionalized with hydrazide obtained in Embodiment 2 ($M_n$ was about 6000, $R_1$-$R_6$ were methyl groups, m/n was 1/1, m has a value in the range of 30 to 40, and n has a value in the range of 30 to 40) was dissolved in tetrahydrofuran. 54 g (about 0.5 mol) of 2-pyridinecarboxaldehyde was dissolved in tetrahydrofuran. Solutions of two reactants were slowly mixed and stirred. The reaction temperature was controlled to be 50° C. The reaction was continuously performed for 12 h. After the reaction was completed, the tetrahydrofuran was removed through reduced pressure distillation to obtain 130.5 g of an intermediate product of polysiloxane functionalized with pyridine with a yield of 94.8%. The equation is as follows:

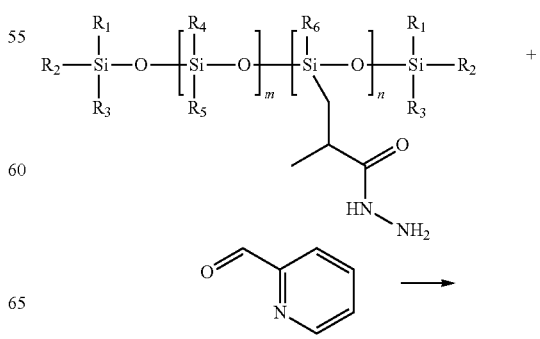

-continued

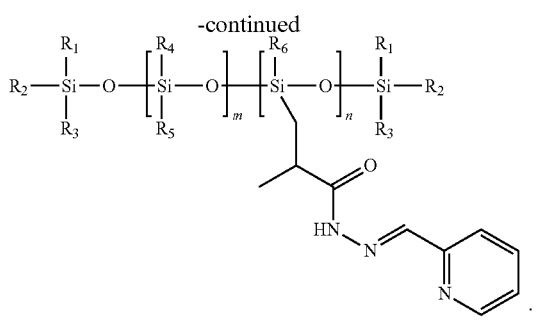

Step 2: In a dry four-neck flask with a temperature indicator, a condenser, a dropping funnel and an Ar introducing opening, 130.5 g (about 0.5 mol) of the product of polysiloxane functionalized with pyridine obtained in Step 1 was dissolved in tetrahydrofuran. 125 mL of 2 mol/L $CuCl_2$ methanol solution was slowly added into the tetrahydrofuran solution with stirring. A reaction temperature was controlled to be 25° C. The reaction was continuously performed for 12 h. After the reaction was completed, the tetrahydrofuran and methanol were removed through reduced pressure distillation to obtain 158.3 g of polysiloxane based on a Cu(II)-pyridine imine coordination group with a yield of 96.8%. The equation is as follows:

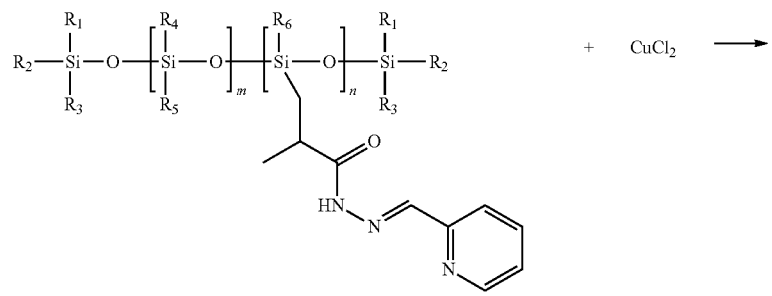

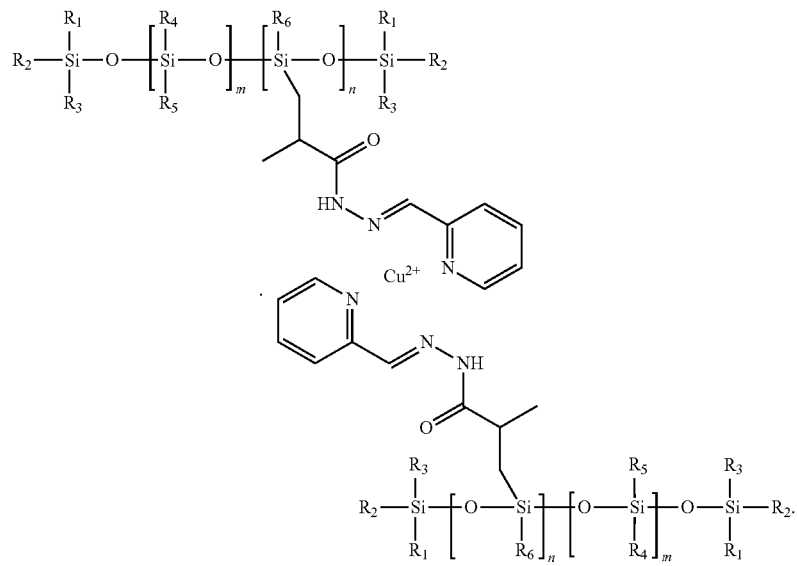

The change of the coordination bond under the change of temperature is as follows:

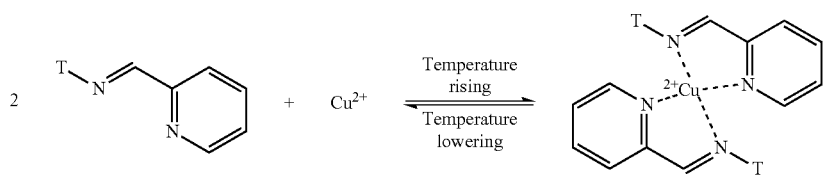

Association and dissociation processes of the coordination bond could be regulated through temperature control. A group T has the following structural formula:

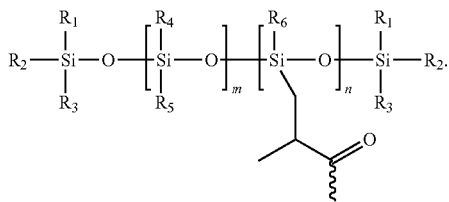

The temperature-sensitive property and mechanical property characterization of the product of the polysiloxane functionalized with reversible coordination bonds obtained in the present embodiment is similar to the properties of the product prepared in Embodiment 1. Detailed data is shown in Table 1. The temperature-sensitive polymer material obtained in the present embodiment has a temperature-sensitive coefficient G'(120)/G'(20) of 20000, the Young modulus of 710 MPa, the maximum stress of 7.3 MPa, and the maximum strain of 7.4%. The above parameters show that the material has excellent temperature-sensitive coefficient, and also has good mechanical properties at the same time.

Embodiment 5 Temperature-Sensitive Polymer Material Based on Coordination Bond

Step 1: In a dry four-neck flask with a temperature indicator, a condenser, a dropping funnel and an Ar introducing opening, 105.5 g of polysiloxane functionalized with allyl glycidyl ether synthesized in Step 1 of Embodiment 1 was dissolved in 150 mL of tetrahydrofuran. 40 g (about 0.6 mol) of imidazole was dissolved in 100 mL of tetrahydrofuran. The tetrahydrofuran solution of the imidazole was added into the polysiloxane solution with stirring. The reaction temperature was controlled to be 80° C. The reaction was continuously performed for 12 h. After the reaction was completed, the solution was concentrated to ¼ of the original volume. Then, 300 mL of methanol was added into the reaction system. A standing and layering was performed for separation. Precipitates were collected. Through reduced pressure distillation, the solvent was removed to obtain 128.6 g of a final product of polysiloxane functionalized with imidazolyl group with a yield of 95.7%. The equation is as follows:

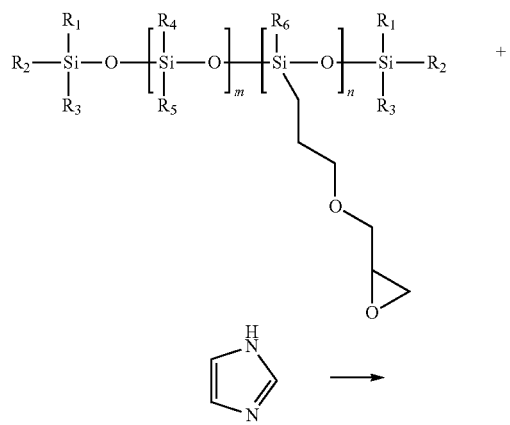

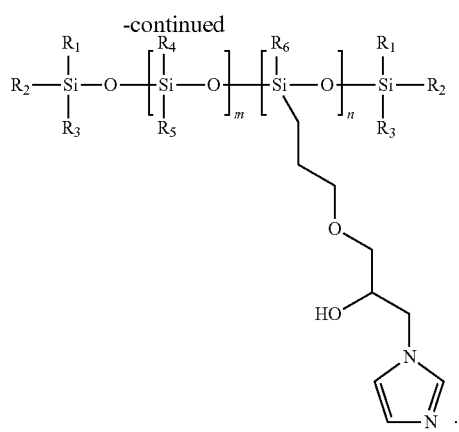

Step 2: In a dry four-neck flask with a temperature indicator, a condenser, a dropping funnel and an Ar introducing opening, 128.6 g (about 0.6 mol) of the product of polysiloxane functionalized with imidazolyl group obtained in Step 1 was dissolved in tetrahydrofuran. 150 mL of 2 mol/L $ZnCl_2$ methanol solution was slowly added into the tetrahydrofuran solution with stirring. The reaction temperature was controlled to be 50° C. The reaction was continuously performed for 8 h. After the reaction was completed, the tetrahydrofuran and methanol were removed through reduced pressure distillation to obtain 154.3 g of polysiloxane based on a Zn(II)-imine coordination group with a yield of 95.8%. The equation is as follows:

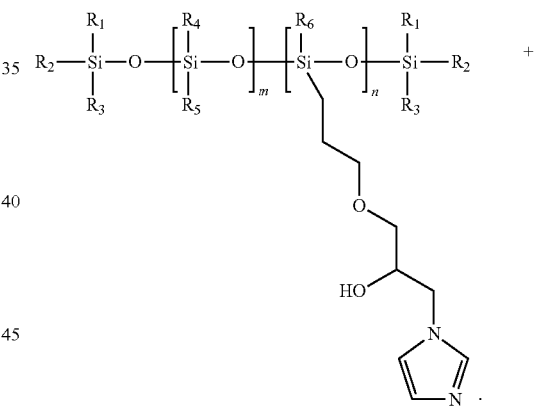

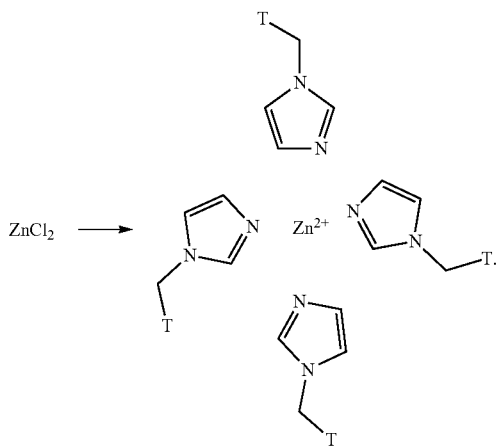

The chance of the coordination bond upon changing temperature is as follows:

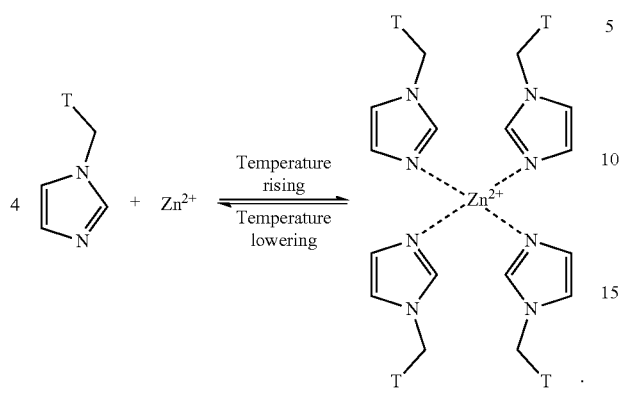

Association and dissociation processes of the coordination bond could be regulated through temperature control. A group T has the following structural formula:

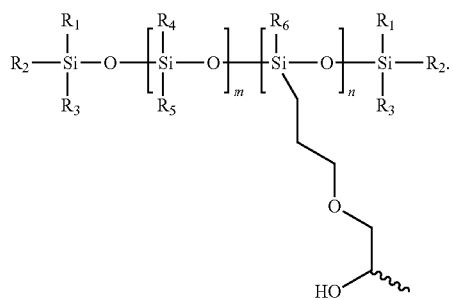

The temperature-sensitive property and mechanical property characterization of the product of the polysiloxane functionalized with reversible coordination bonds obtained in the present embodiment is similar to the properties of the product prepared in Embodiment 1. Detailed data is shown in Table 1. The temperature-sensitive polymer material obtained in the present embodiment has a temperature-sensitive coefficient G'(120)/G'(20) of 19000, the Young modulus of 570 MPa, the maximum stress of 7.3 MPa, and the maximum strain of 6.5%. The above parameters show that the material has excellent temperature-sensitive coefficient, and also has good mechanical properties at the same time.

Embodiment 6 Temperature-Sensitive Polymer Material Based on Coordination Bond Step 1: In a dry four-neck flask with a temperature indicator, a condenser, a dropping funnel and an Ar introducing opening, 131.5 g of polysiloxane functionalized with methyl methacrylate synthesized in Step 1 of Embodiment 2 was dissolved in 150 mL of tetrahydrofuran. 300 mL of 1 wt % hydrochloric acid solution was added with stirring. The reaction temperature was controlled to be 60° C. The reaction was continuously performed for 12 h. After the reaction was completed, a standing and layering was performed for separation. A tetrahydrofuran phase was extracted. The solvent was removed through reduced pressure distillation to obtain 118.6 g of a final product of polysiloxane functionalized with carboxyl group with a yield of 96.1%. The equation is as follows:

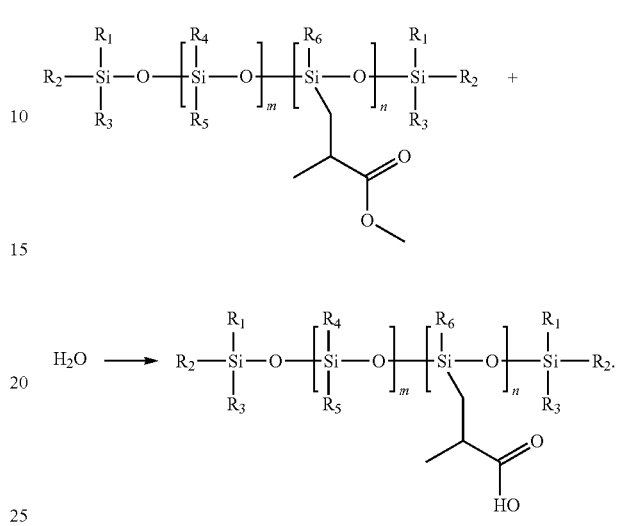

Step 2: In a dry four-neck flask with a temperature indicator, a condenser, a dropping funnel and an Ar introducing opening, 118.6 g (about 0.6 mol) of the product of polysiloxane functionalized with carboxyl group obtained in Step 1 was dissolved in tetrahydrofuran. 150 mL of 2 mol/L $ZnCl_2$ methanol solution and 60.6 g of triethylamine were slowly added into the tetrahydrofuran solution with stirring. The reaction temperature was controlled to be 50° C. The reaction was continuously performed for 12 h. After the reaction was completed, the tetrahydrofuran, the methanol and the excessive triethylamine were removed through reduced pressure distillation to obtain 154.3 g of polysiloxane based on a Zn(II)-carboxyl coordinate group with a yield of 94.9%. The equation is as follows:

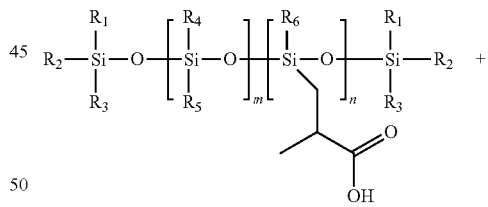

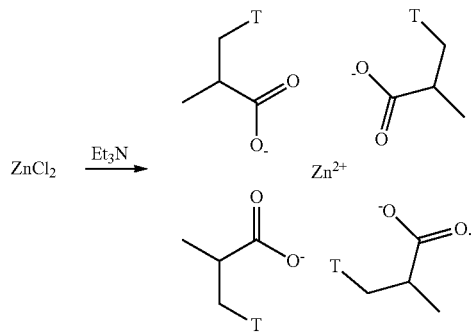

The change of coordination bond upon changing the temperature is as follows:

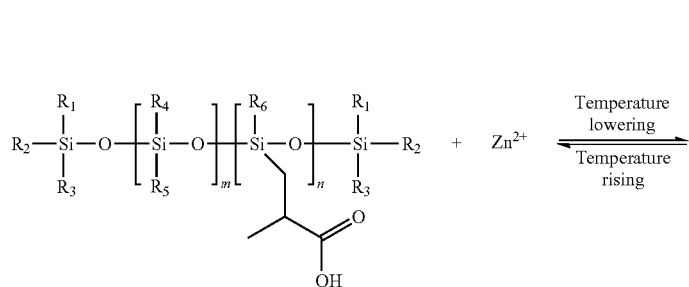 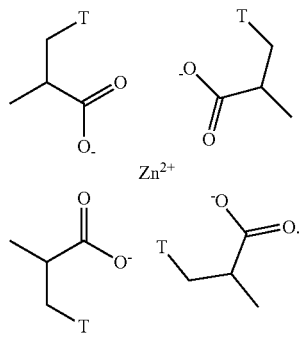

Association and dissociation processes of the coordination bond could be regulated through temperature control. A group T has the following structural formula:

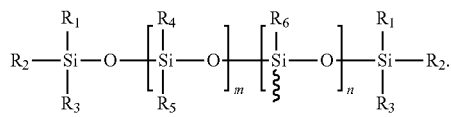

The temperature-sensitive property and mechanical property characterization of the product of the polysiloxane functionalized with reversible coordination bond obtained in the present embodiment is similar to the properties of the product prepared in Embodiment 1. Detailed data is shown in Table 1. The temperature-sensitive polymer material obtained in the present embodiment has a temperature-sensitive coefficient G'(120)/G'(20) of 17000, the Young modulus of 680 MPa, the maximum stress of 8.6 MPa, and the maximum strain of 5.8%. The above parameters show that the material has excellent temperature-sensitive coefficient, and also has good mechanical properties at the same time.

Synthesis methods of other temperature-sensitive polymer materials based on coordination bonds are similar to those in Embodiment 4, Embodiment 5 and Embodiment 6, and only reaction raw materials need to be correspondingly replaced.

Embodiment 7 Temperature-Sensitive Polymer Material Based on Covalent Bonds

Step 1: In a dry four-neck flask with a temperature indicator, a condenser, a dropping funnel and an Ar introducing opening, 105.5 g of polysiloxane functionalized with allyl glycidyl ether synthesized in Step 1 of Embodiment 1 was dissolved in 150 mL of tetrahydrofuran. 75.6 g (about 0.6 mol) of 2-furylacetic acid was dissolved in 100 mL of tetrahydrofuran. The tetrahydrofuran solution of 2-furylacetic acid was added into the polysiloxane solution with stirring. The reaction temperature was controlled to be 100° C. The reaction was continuously performed for 12 h. After the reaction was completed, the solution was concentrated to ¼ of the original volume. Then, 300 mL of methanol was added into the reaction system. A standing and layering process was performed for separation. Precipitates were collected. The solvent was removed through reduced pressure distillation to obtain 158.6 g of a final product of polysiloxane functionalized with furyl group with a yield of 96.7%. The equation is as follows:

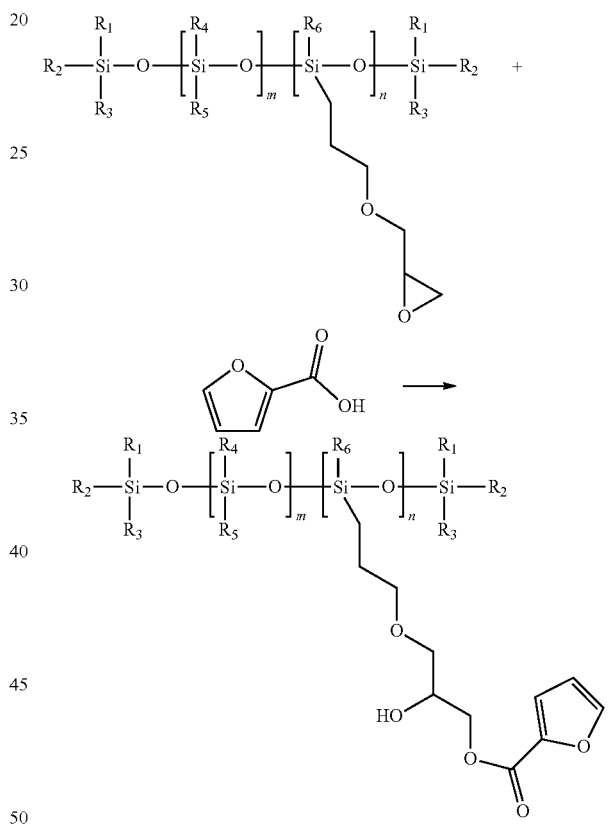

Step 2: In a dry four-neck flask with a temperature indicator, a condenser, a dropping funnel and an Ar introducing opening, 105.5 g of polysiloxane functionalized with allyl glycidyl ether synthesized in Step 1 of Embodiment 1 was dissolved in 150 mL of tetrahydrofuran. 75.6 g (about 0.6 mol) of 2-furylacetic acid was dissolved in 100 mL of tetrahydrofuran. 58.2 g (0.6 mol) of tetrahydrofuran solution of maleimide was added into the polysiloxane solution with stirring. The reaction temperature was controlled at 100° C. The reaction was continuously performed for 12 h. After the reaction was completed, the solution was concentrated to ¼ of the original volume. Then, 300 mL of methanol was added into the reaction system. A standing and layering process was performed for separation. Precipitates were collected. The solvent was removed through reduced pressure distillation to obtain 128.6 g of a final product of polysiloxane functionalized with maleimide group with a yield of 96.7%. The equation is as follows:

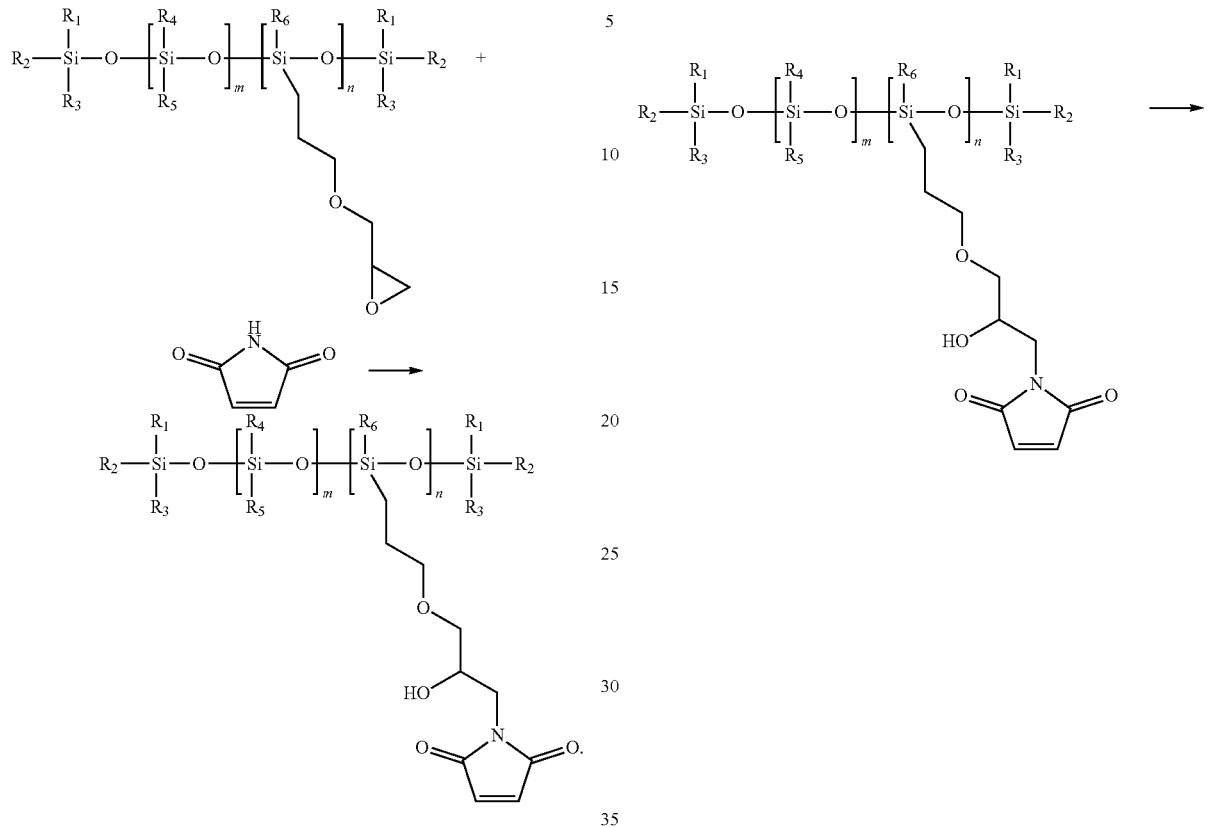

Step 3: In a dry four-neck flask with a temperature indicator, a condenser, a dropping funnel and an Ar introducing opening, 158.6 g of polysiloxane functionalized with furyl group synthesized in Step 1 and 128.6 g of polysiloxane functionalized with maleimide group were dissolved in 150 mL of tetrahydrofuran. The above solutions were mixed and stirred. The solved was removed through reduced pressure distillation so that reactants were uniformly mixed. Then, the mixture was put into a polytetrafluoroethylene mold to be put into a 130° C. oven for reaction for 12 h. 280.2 g of a temperature-sensitive material based on a covalent bond was obtained with a yield of 98.7%. The equations is as follows:

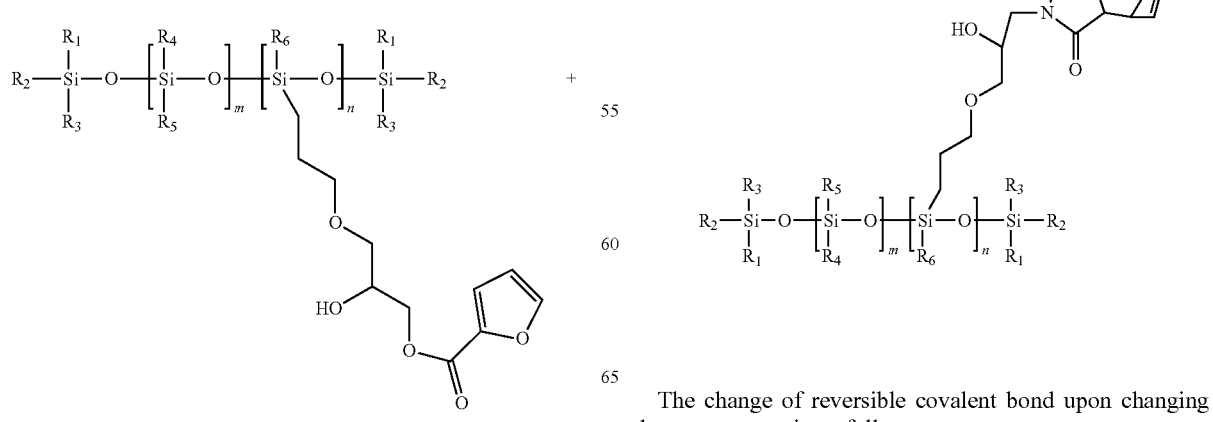

The change of reversible covalent bond upon changing the temperature is as follows:

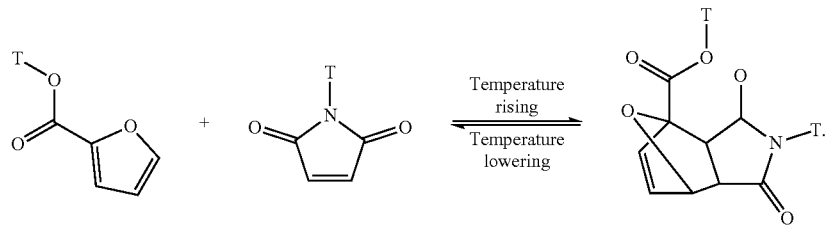

Crosslinking and decrosslinking effects of the covalent bond could be regulated through temperature control. A group T has the following structural formula:

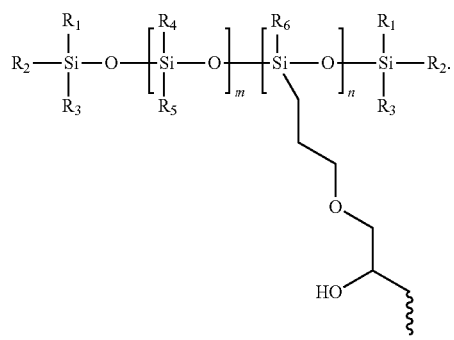

The temperature-sensitive property and mechanical property characterization of the product of the polysiloxane functionalized with reversible covalent bond obtained in the present embodiment is similar to the properties of the product prepared in Embodiment 1. Detailed data is shown in Table 1. The temperature-sensitive polymer material obtained in the present embodiment has a temperature-sensitive coefficient G'(120)/G'(20) of 26000, the Young modulus of 890 MPa, the maximum stress of 12.7 MPa, and the maximum strain of 18.9%. The above parameters show that the material has excellent temperature-sensitive coefficient, and also has good mechanical properties at the same time.

Embodiment 8 Temperature-Sensitive Polymer Material Based on Covalent Bonds

Step 1: In a dry four-neck flask with a temperature indicator, a condenser, a dropping funnel and an Ar introducing opening, 105.5 g of polysiloxane functionalized with allyl glycidyl ether synthesized in Step 1 of Embodiment 1 was dissolved in 150 mL of tetrahydrofuran. 73.2 g (about 0.6 mol) of salicylaldehyde was dissolved in 200 mL of tetrahydrofuran. The tetrahydrofuran solution of salicylaldehyde was added into the polysiloxane solution with stirring. The reaction temperature was controlled at 100° C. The reaction was continuously performed for 12 h. After the reaction was completed, the solution was concentrated to ¼ of the original volume. Then, 300 mL of methanol was added into the reaction system. A standing and layering process was performed for separation. Precipitates were collected. The solvent was removed through reduced pressure distillation to obtain 161.6 g of a final product of polysiloxane functionalized with formyl group with a yield of 95.2%. The equation is as follows:

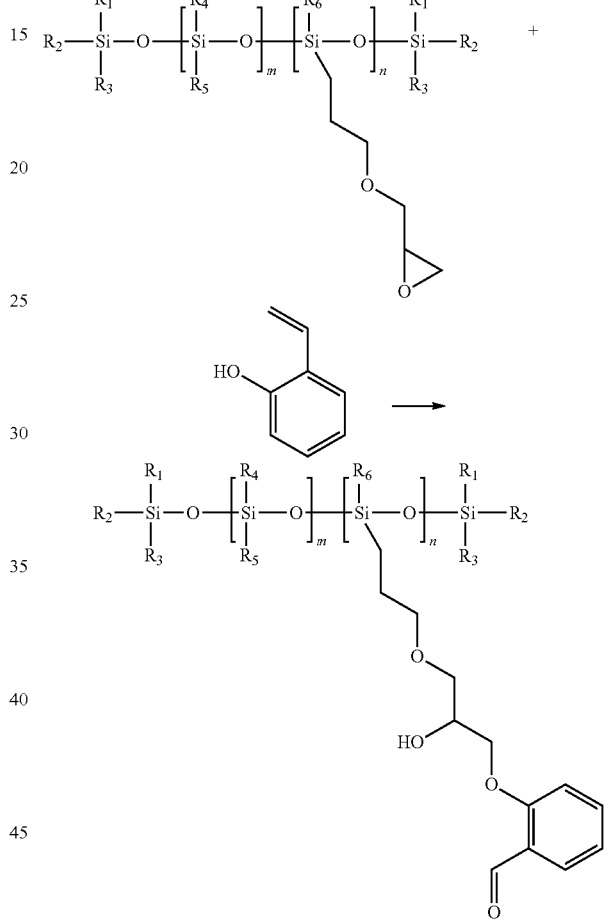

Step 2: In a dry four-neck flask with a temperature indicator, a condenser, a dropping funnel and an Ar introducing opening, 118.5 g of polysiloxane functionalized with hydrazide synthesized in Step 2 of Embodiment 2 was dissolved in 150 mL of tetrahydrofuran. 161.6 g of polysiloxane functionalized with formyl group in Step 1 of the present embodiment was dissolved in 200 mL of tetrahydrofuran. The two above tetrahydrofuran solutions were mixed with stirring. The reaction temperature was controlled at 80° C. The reaction was continuously performed for 12 h. After the reaction was completed, the solution was concentrated to ¼ of the original volume. Then, 300 mL of methanol was added into the reaction system. A standing and layering process was performed for separation. The solvent was removed through reduced pressure distillation to obtain 161.6 g of a final product of polysiloxane functionalized with formyl group with a yield of 95.2%. The equation is as follows:

61
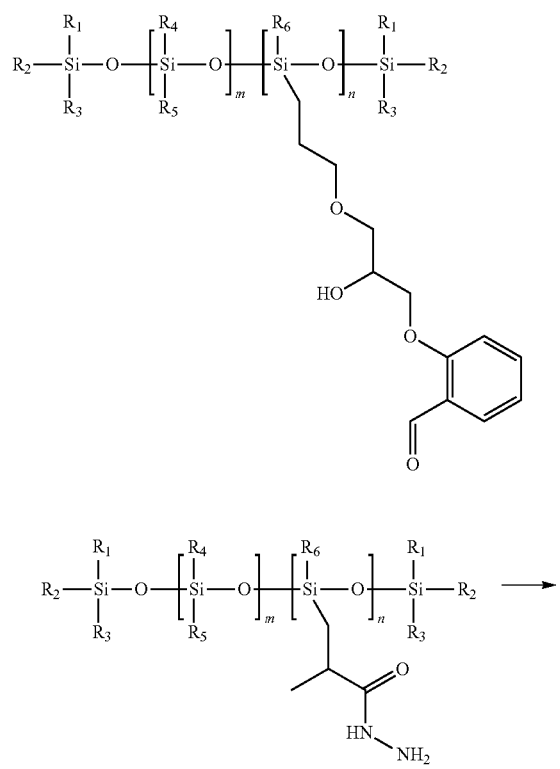
+
62
-continued
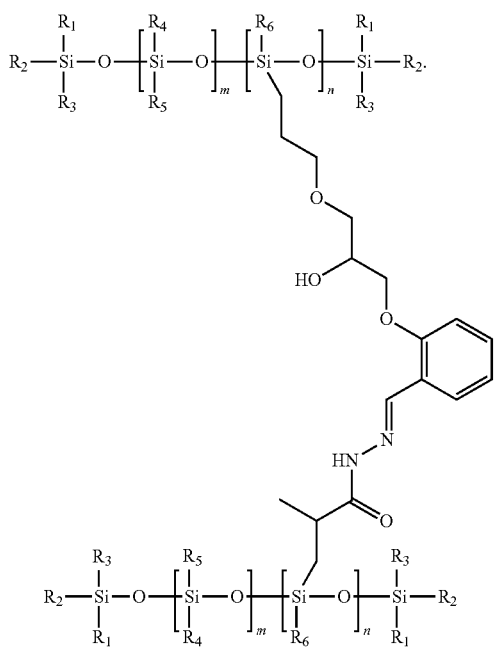
The change of reversible covalent bond upon changing the temperature is as follows:
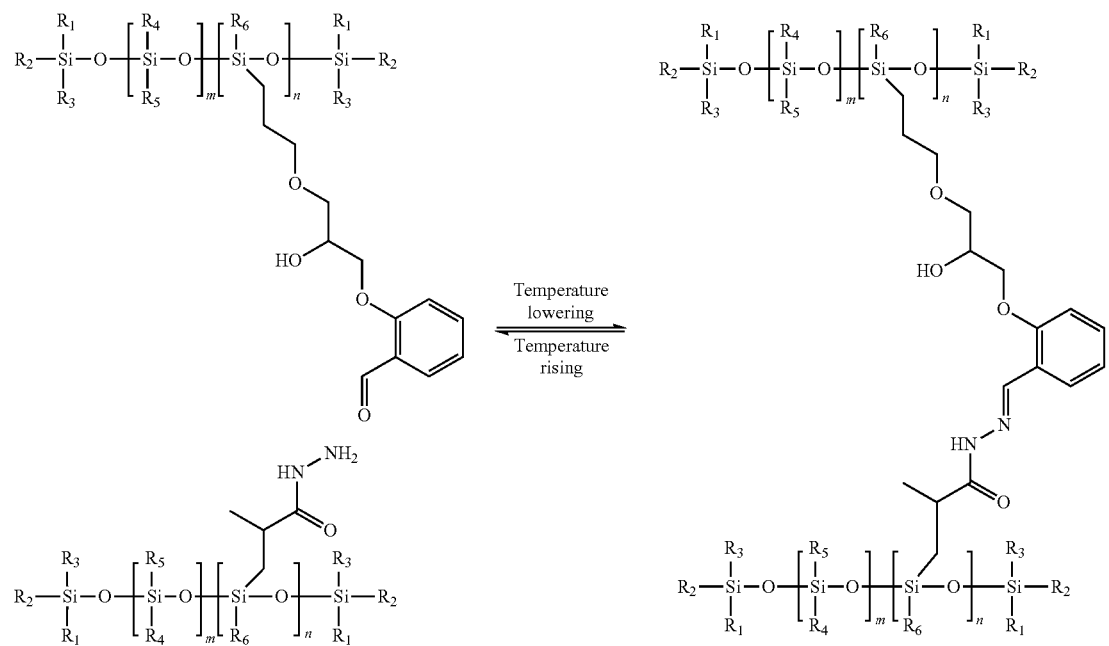

The temperature-sensitive property and mechanical property characterization of the product of the polysiloxane functionalized with reversible covalent bond obtained in the present embodiment is similar to the properties of the product prepared in Embodiment 1. Detailed data is shown in Table 1. The temperature-sensitive polymer material obtained in the present embodiment has a temperature-sensitive coefficient G'(120)/G'(20) of 13000, the Young modulus of 550 MPa, the maximum stress of 9.6 MPa, and the maximum strain of 53.9%. The above parameters show that the material has excellent temperature-sensitive coefficient, and also has good mechanical properties at the same time. Synthesis methods of other temperature-sensitive polymer materials based on a covalent bond are similar to those in Embodiment 7 and Embodiment 8, and only reaction raw materials need to be correspondingly replaced.

TABLE 1

Temperature-sensitive property and mechanical property data of temperature-sensitive polymer obtained in Embodiments 1-8

| Embodiment | Temperature-sensitive coefficient (G'(120)/G'(20)) | Young modulus (MPa) | Maximum stress (MPa) | Maximum strain (%) |
|---|---|---|---|---|
| 1 | 16000 | 520 | 5.9 | 5.4 |
| 2 | 12000 | 610 | 6.2 | 12.5 |
| 3 | 9000 | 380 | 4.6 | 25.3 |
| 4 | 20000 | 710 | 7.3 | 7.4 |
| 5 | 19000 | 570 | 7.3 | 6.5 |
| 6 | 17000 | 680 | 8.6 | 5.8 |
| 7 | 26000 | 890 | 12.7 | 18.9 |
| 8 | 13000 | 550 | 9.6 | 53.9 |

Embodiment 9 Preparation of Fast Shaping Support Frame

A formula is as follows (weight parts): 80 parts of temperature-sensitive polymers based on a coordinate bond in Embodiment 1; 5 parts of ethylene-vinyl acetate copolymers (additive); 5 parts of ethylene-octene copolymers (toughening agent); 5 parts of carbon fiber (filler); and 5 parts of titanium dioxide (pigment).

A preparation method is as follows:
a. Various ingredients were fed into a blending apparatus to be blended according to weight percent, so as to become a uniform blended material.
b. The blended material was extruded.
c. The extruded material was made to present a required shape through 3D printing, cutting, injection molding or calendaring according to requirements.

Property indexes are as follows: strength temperature sensitivity $\delta = G_{max}/G_{min}(\Delta T=100° C.) \geq 1000$, the maximum stress$\geq$5 MPa, the Young modulus$\geq$500 MPa, a softening point is between 50 and 70° C., a deformation-fixation time$\leq$10 min, an elongation at break$\geq$5%, and a residual deformation rate$\leq$10%.

Preparation methods of the fast shaping external fixation support frames based on the temperature-sensitive polymers in Embodiments 2-8 are similar to that in Embodiment 9, and only temperature-sensitive polymers and auxiliary agents need to be correspondingly regulated.

What is claimed is:
1. A temperature-sensitive material, comprising a modified polysiloxane and one or more metal ions selected from alkali metal ions, alkaline earth metal ions, and transition metal ions, wherein the modified polysiloxane is of Formula I:

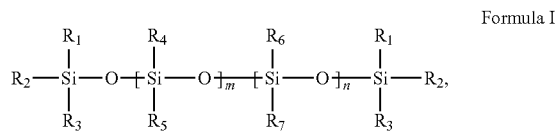

Formula I wherein m is an integer from 0 to 10000, n is an integer from 0 to 10000, with the proviso that m and n are not simultaneously 0;

$R_1$-$R_7$ are the same or different, independently selected from a moiety of Formula II, an amino group, a hydroxyl group, a thiol group, a carboxyl group, a methoxyl group, a nitro group, a halogen atom, an unsubstituted C1-C50 alkyl group, an unsubstituted C1-C50 cycloalkyl group, a substituted C1-C50 alkyl group, and a substituted C1-C50 cycloalkyl group, wherein the substituents are selected from one or more amino groups, hydroxyl groups, thiol groups, carboxyl groups, methoxyl groups, nitro groups or halogen atoms, and a phenyl group or naphthyl group non-substituted or substituted by one or more C1-C50 alkyl groups, C1-C50 alkoxy groups, amino groups, hydroxyl groups, thiol groups, carboxyl groups, methoxyl groups, nitro groups, halogen atoms, with the proviso that at least one of $R_1$-$R_7$ is the moiety of Formula II;

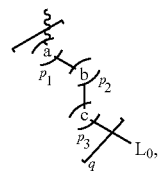

Formula II in Formula II, a, b and c are the same or different, and represent units formed by connecting one or more of —$CH_2$—, —NH—, —O—, —S—, —CO— and —CH($R_8$)— in any order; $R_8$ is selected from a hydrogen atom, an amino group, a hydroxyl group, a thiol group, a carboxyl group, a methoxyl group, a nitro group, a halogen atom, an unsubstituted C1-C50 alkyl group, an unsubstituted C1-050 cycloalkyl group, a substituted C1-C50 alkyl group, and a substituted C1-C50 cycloalkyl group, wherein the substituents are selected from one or more amino groups, hydroxyl groups, thiol groups, carboxyl groups, methoxyl groups, nitro groups or halogen atoms, and a phenyl group or naphthyl group non-substituted or substituted by one or more C1-C50 alkyl groups, C1-C50 alkoxy groups, amino groups, hydroxyl groups, thiol groups, carboxyl groups, methoxyl groups, nitro groups, and halogen atoms; $p_1$, $p_2$ and $p_3$ are the same or different, and are integers from 0 to 500; q is an integer from 0 to 500; $L_0$ is selected from

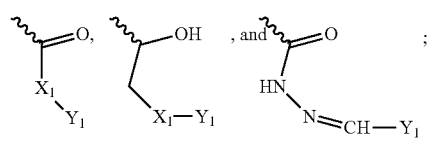

$X_1$ represents —$CH_2$—, —NH—, —O—, —S—, —COO—, or —CO—;

$Y_1$ represents

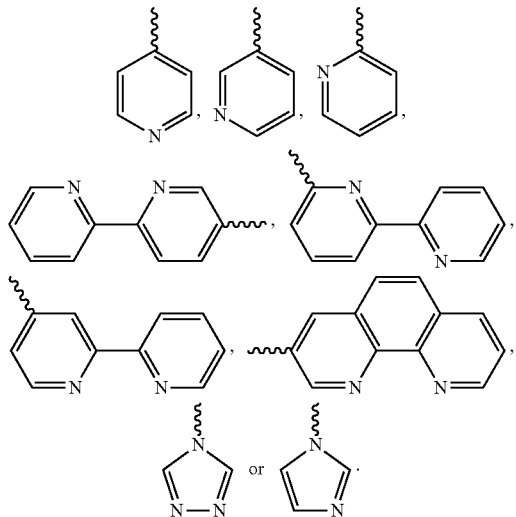

2. A temperature-sensitive material comprising a modified polysiloxane,

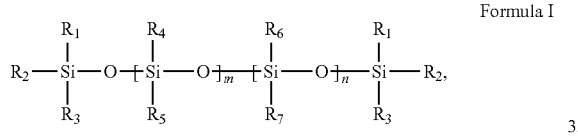

Formula I wherein m is an integer from 0 to 10000, n is an integer from 0 to 10000, with the proviso that m and n are not simultaneously 0;

$R_1$-$R_7$ are the same or different, independently selected from a moiety of Formula II, an amino group, a hydroxyl group, a thiol group, a carboxyl group, a methoxyl group, a nitro group, a halogen atom, an unsubstituted C1-C50 alkyl group, an unsubstituted C1-C50 cycloalkyl group, a substituted C1-C50 alkyl group, and a substituted C1-C50 cycloalkyl group, wherein the substituents are selected from one or more amino groups, hydroxyl groups, thiol groups, carboxyl groups, methoxyl groups, nitro groups or halogen atoms, and a phenyl group or naphthyl group non-substituted or substituted by one or more C1-C50 alkyl groups, C1-C50 alkoxy groups, amino groups, hydroxyl groups, thiol groups, carboxyl groups, methoxyl groups, nitro groups, and halogen atoms, with the proviso that at least one among $R_1$-$R_7$ is the moiety of Formula II;

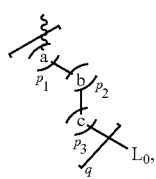

Formula II in Formula II, a, b, and c are the same or different, and represent units formed by connecting one or more of —$CH_2$—, —NH—, —O—, —S—, —COO—, —CO—, and —$CH(R_8)$— in any order; $R_8$ is selected from a hydrogen atom, an amino group, a hydroxyl group, a thiol group, a carboxyl group, a methoxyl group, a nitro group, a halogen atom, a unsubstituted C1-C50 alkyl group, a unsubstituted C1-050 cycloalkyl group, a substituted C1-050 alkyl group, and a substituted C1-050 cycloalkyl group, wherein the substituents are selected from one or more amino groups, hydroxyl groups, thiol groups, carboxyl groups, methoxyl groups, nitro groups or halogen atoms, and a phenyl group or naphthyl group non-substituted or substituted by one or more C1-050 alkyl groups, C1-050 alkoxy groups, amino groups, hydroxyl groups, thiol groups, carboxyl groups, methoxyl groups, nitro groups, and halogen atoms; $p_1$, $p_2$ and $p_3$ are the same or different, and are integers from 0 to 500; q is an integer from 0 to 500, wherein:

$L_0$ represents a group having a reversible chemical bond system based on a hydrogen bond, and is selected from:

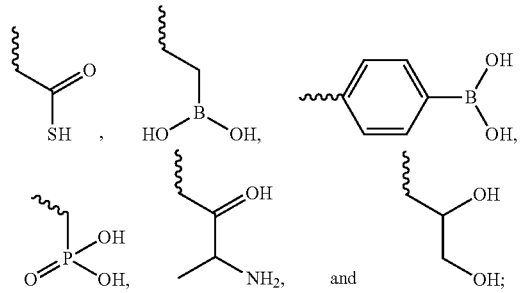

or, $L_0$ represents a group having a reversible chemical bond system based on a coordinate bond, and is formed by a ligand and metal ions M through coordination, and the ligand is selected from:

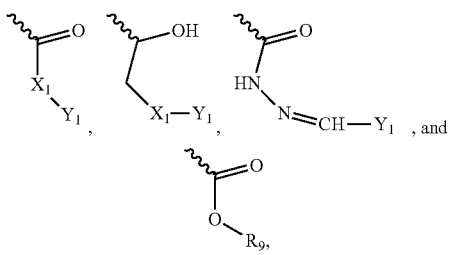

wherein $X_1$ represents —$CH_2$—, —NH—, —O—, —S—, —COO—, or —CO—;

$Y_1$ represents:

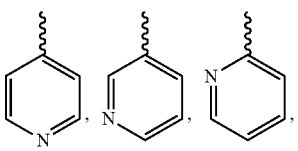

-continued

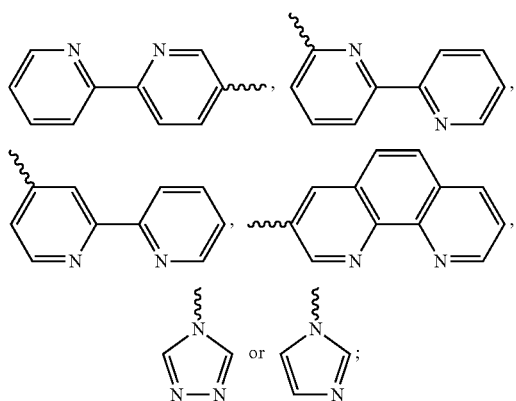

R₉ is selected from a hydrogen atom or an amino group, a hydroxyl group, a thiol group, a carboxyl group, a methoxyl group, a nitro group, a halogen atom, a C1-C50 alkyl group or cycloalkyl group non-substituted or substituted by one or more amino groups, hydroxyl groups, thiol groups, carboxyl groups, methoxyl groups, nitro groups or halogen atoms, and a phenyl group or naphthyl group non-substituted or substituted by one or more C1-C50 alkyl groups, C1-C50 alkoxy groups, amino groups, hydroxyl groups, thiol groups, carboxyl groups, methoxyl groups, nitro groups, and halogen atoms;

M is one or more of alkali metal, alkaline-earth metal, transition metal and rare earth metal ions;

or, L₀ represents a group having a reversible chemical bond system based on a covalent bond, and is selected from

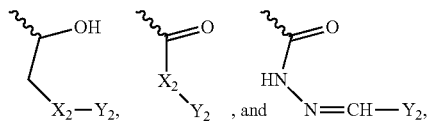

$X_2$ represents —NH—, —O—, —S—, —COO— or —CO—; and $Y_2$ represents:

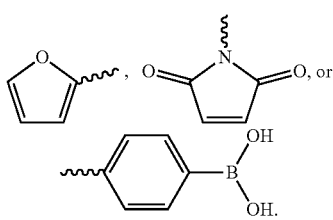

3. A method for preparing a temperature sensitive material, comprising:

mixing a modified polysiloxane and one or more additives to form a mixture; and extruding the mixture to obtain the temperature sensitive material, wherein the modified polysiloxane is of Formula I,

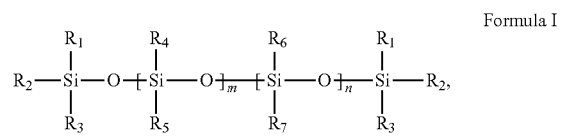

Formula I wherein m is an integer from 0 to 10000, n is an integer from 0 to 10000, with the proviso that m and n are not simultaneously 0;

$R_1$-$R_7$ are the same or different, independently selected from a moiety of Formula II, an amino group, a hydroxyl group, a thiol group, a carboxyl group, a methoxyl group, a nitro group, a halogen group, an unsubstituted C1-C50 alkyl group, an unsubstituted C1-C50 cycloalkyl group, a substituted C1-C50 alkyl group, and a substituted C1-C50 cycloalkyl group, wherein the substituents are selected from one or more amino groups, hydroxyl groups, thiol groups, carboxyl groups, methoxyl groups, nitro groups or halogen atoms, and a phenyl group or naphthyl group non-substituted or substituted by one or more C1-C50 alkyl groups, C1-C50 alkoxy groups, amino groups, hydroxyl groups, thiol groups, carboxyl groups, methoxyl groups, nitro groups, and halogen atoms, with the proviso that at least one among $R_1$-$R_7$ is the moiety of Formula II;

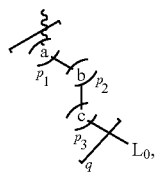

Formula II in Formula II, a, b, and c are the same or different, and represent units formed by connecting one or more of —CH₂—, —NH—, —O—, —S—, —COO—, —CO—, and —CH($R_8$)— in any order; $R_8$ is selected from a hydrogen atom, an amino group, a hydroxyl group, a thiol group, a carboxyl group, a methoxyl group, a nitro group, a halogen atom, an unsubstituted C1-C50 alkyl group, an unsubstituted C1-050 cycloalkyl group, a substituted C1-050 alkyl group, and a substituted C1-050 cycloalkyl group, wherein the substituents are selected from one or more amino groups, hydroxyl groups, thiol groups, carboxyl groups, methoxyl groups, nitro groups or halogen atoms, and a phenyl group or naphthyl group non-substituted or substituted by one or more C1-C50 alkyl groups, C1-050 alkoxy groups, amino groups, hydroxyl groups, thiol groups, carboxyl groups, methoxyl groups, nitro groups, and halogen atoms; $p_1$, $p_2$ and $p_3$ are the same or different, and are integers from 0 to 500; q is an integer from 0 to 500, wherein:

$L_O$ represents a group having a reversible chemical bond system based on a hydrogen bond, and is selected from:

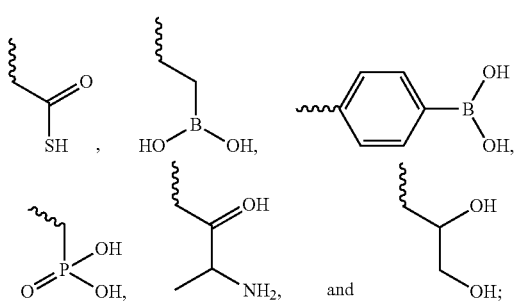

or, L₀ represents a group having a reversible chemical bond system based on a coordinate bond,
and is formed by a ligand and metal ions M through coordination, and the ligand is selected from:

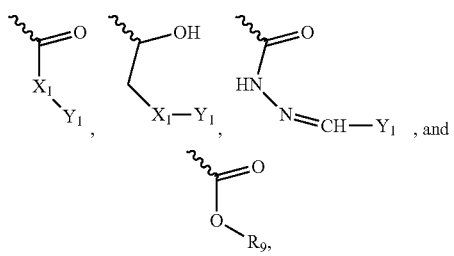

wherein $X_1$ represents —CH$_2$—, —NH—, —O—, —S—, —COO—, or —CO—;
$Y_1$ represents:

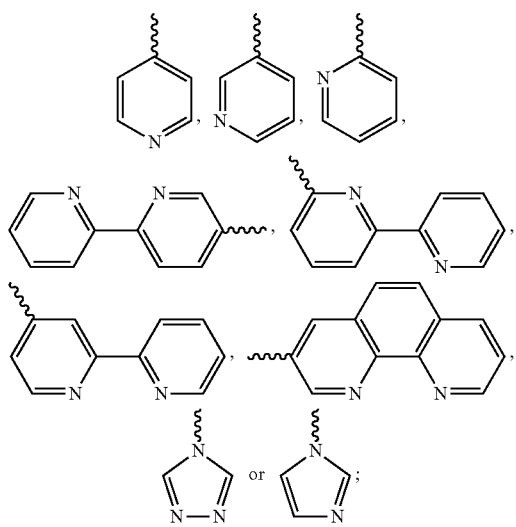

$R_9$ is selected from a hydrogen atom or an amino group, a hydroxyl group, a thiol group, a carboxyl group, a methoxyl group, a nitro group, a halogen atom, a C1-050 alkyl group or cycloalkyl group non-substituted or substituted by one or more amino groups, hydroxyl groups, thiol groups, carboxyl groups, methoxyl groups, nitro groups or halogen atoms, and a phenyl group or naphthyl group non-substituted or substituted by one or more C1-C50 alkyl groups, C1-050 alkoxy groups, amino groups, hydroxyl groups, thiol groups, carboxyl groups, methoxyl groups, nitro groups, and halogen atoms;

M is one or more of alkali metal, alkaline-earth metal, transition metal and rare earth metal ions;

or, $L_0$ represents a group having a reversible chemical bond system based on a covalent bond, and is selected from

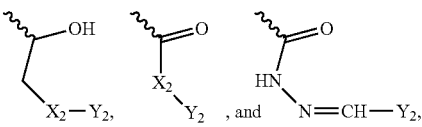

$X_2$ represents —NH—, —O—, —S—, —COO— or —CO—; and
$Y_2$ represents:

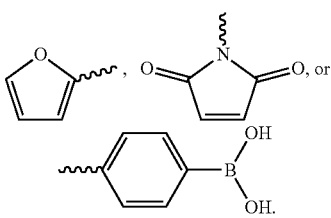

4. The method according to claim 3, wherein each of the one or more additives is selected from a polymer additive, a plasticizer, a toughening agent, a stabilizing agent, a lubricating agent, a nanometer additive, a filler, a color additive, and a medicinal component.

5. A method for preparing the temperature sensitive material of claim 1, comprising:
mixing the modified polysiloxane, the one or more metal ions, and one or more additives to form a mixture; and
extruding the mixture to obtain the temperature sensitive material.

6. The method according to claim 5, wherein each of the one or more additives is selected from a polymer additive, a plasticizer, a toughening agent, a stabilizing agent, a lubricating agent, a nanometer additive, a filler, a color additive, and a medicinal component.

7. The temperature-sensitive material of claim 2, wherein, in Formula I, m is an integer from 0 to 200, n is an integer from 0 to 200; $R_1$-$R_7$ are selected from the moiety of Formula II, an amino group, a hydroxyl group, a thiol group, a carboxyl group, a methoxyl group, a nitro group, a phenyl group, a benzyl group, a phenolic group, an alkoxyphenyl group, a C1-C30 alkyl group, a C1-C30 alkoxy group, and a C1-C30 halogenated alkyl group, with the proviso that at least one among $R_1$-$R_7$ is the moiety of Formula II.

8. The temperature-sensitive material of claim 2, wherein, in Formula II, a, b and c are the same or different, and represent units formed by connecting one or more of —CH$_2$—, —NH—, —O—, —CO—, and —CH($R_8$)— in any order, and $R_8$ represents a methyl group, an ethyl group, a phenyl group, a hydroxyl group, a thiol group, a carboxyl group, and an amino group; $p_1$, $p_2$, and $p_3$ are integers from 1 to 20; and q is an integer from 0 to 20.

9. The temperature-sensitive material of claim 8, wherein, in Formula II,
$p_2$ and $p_3$ are 0, -[(a)$p_1$-(b)$p_2$-(c)$p_3$]q- represents —(CH$_2$)$p_1$-, —(NH)$p_1$-, —(S)$p_1$-, —(CO)$p_1$-, or —(CH($R_8$))$p_1$-, $p_1$ is an integer from 1 to 20, and q is 1; or $p_3$ is equal to 0, $-[(a)p_1-(b)p_2-(c)p_3]q-$ represents $—[(CH_2)p_1-(NH)p_2]q-$, $—[(CH_2)p_1-(O)p_2]q-$, $—[(CH_2)p_1-(S)p_2]q-$, $—[(CH_2)p_1-(COO)p_2]q-$, $—[(CH_2)p_1-(CO)p_2]q-$, $—[(CH(R_8))p_1-(CH_2)p_2]-$, $—[(NH)p_1-(CH_2)p_2]q-$, $—[(S)p_1-(CO)p_2]-$ and $—[(CH(R_8))p_1-(COO)p_2]q-$, $p_1$ and $p_2$ are integers from 1 to 20, and q is an integer from 1 to 20; or $-[(a)p_1-(b)p_2-(c)p_3]q-$ represents $—[(CH_2)p_1-(O)p_2-(CH_2)p_3]q-$, $-[(CH_2)p_1-(CH_2)p_2-(O)p_3]q-$, $-[(CO)p_1-(CH_2)p_2-(CO)p_3]q$, $-[(CO)p_1-(O)p_2-(CO)p_3-]q$, $-[(CH(R_8))p_1-(CH_2)p_2-(CH(R_8))p_3]q-$, or $—[(CH(R_8))p_1-(CH_2)p_2-(CH_2)p_3]q-$, $p_1$, $p_2$ and $p_3$ are integers from 1 to and 20, and q is an integer from 1 to 20; and $R_8$ represents a methyl group, an ethyl group, a phenyl group, a hydroxyl group, a carboxyl group, or an amino group.

10. The temperature-sensitive material of claim 2, wherein, in Formula II, $L_0$ represents

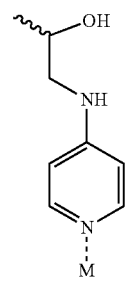 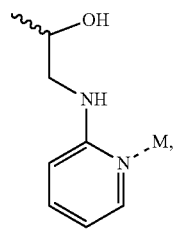 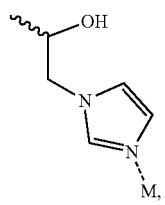

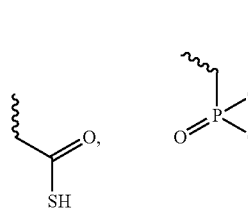

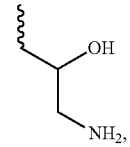 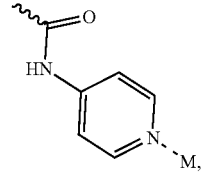

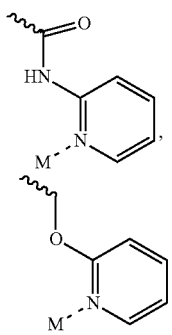

-continued

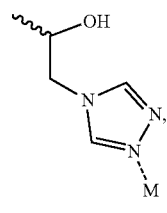 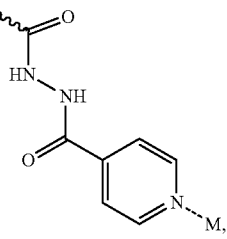

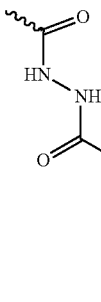 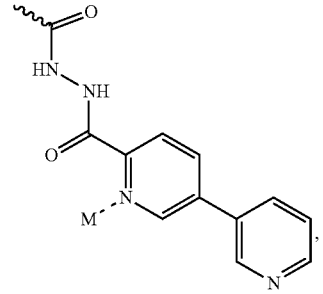

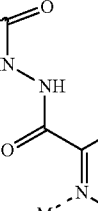

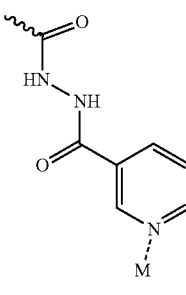 

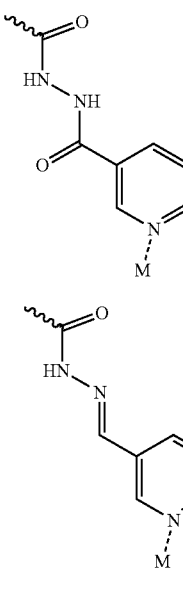 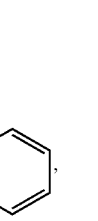

-continued
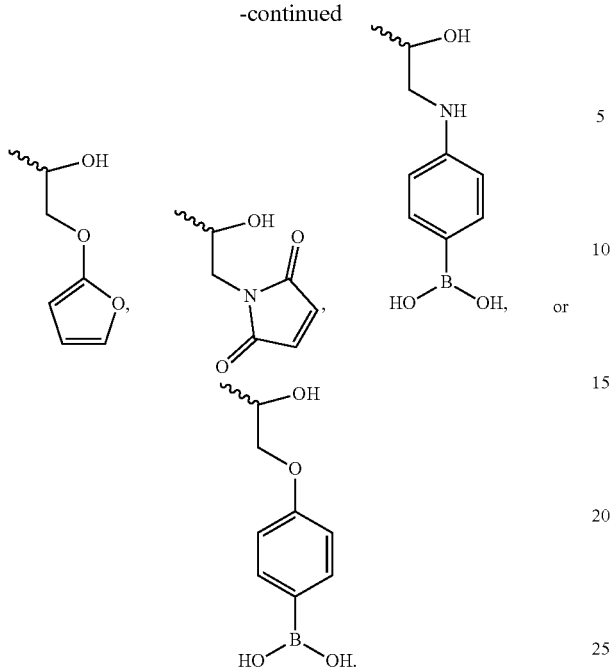
11. The temperature-sensitive material of claim 1, wherein the one or more metal ions is selected from $Zn^{2+}$, $Cu^{2+}$, $Fe^{3+}$, $Fe^{2+}$, $Co^{2+}$, $Pb^{2+}$, $Sn^{2+}$, $Al^{3+}$, $Ag^+$, $Ni^{2+}$, $Ca^{2+}$, $Eu^{3+}$, $Tb^{3+}$, $Na^+$, and $Kt^+$.
* * * * *